(12) United States Patent
Oida

(10) Patent No.: US 7,397,574 B1
(45) Date of Patent: Jul. 8, 2008

(54) IMAGE PROCESSING CONTROLLING DISTRIBUTION OF WORK AMONG APPARATUSES BASED ON APPARATUS PERFORMANCE

(75) Inventor: Jun Oida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 452 days.

(21) Appl. No.: 09/650,999

(22) Filed: Aug. 31, 2000

(30) Foreign Application Priority Data

Aug. 31, 1999 (JP) .................................. 11-246724
Aug. 28, 2000 (JP) ............................. 2000-257956
Aug. 29, 2000 (JP) ............................. 2000-258914

(51) Int. Cl.
*G06F 15/00* (2006.01)
*G06F 15/173* (2006.01)

(52) U.S. Cl. ..................................... 358/1.15; 709/228
(58) Field of Classification Search ................. 348/207, 348/207.2; 358/1.15, 302, 1.13, 1.16, 325, 358/474; 710/8–14; 707/3, 200, 104.1; 709/228, 709/222, 236; 382/232, 190; 715/234
See application file for complete search history.

(56) References Cited

U.S. PATENT DOCUMENTS 5,333,246 A * 7/1994 Nagasaka ................... 345/619
6,273,535 B1 * 8/2001 Inoue et al. ..................... 347/3
6,552,743 B1 * 4/2003 Rissman .................. 348/207.2
6,940,541 B1 * 9/2005 Small ...................... 348/207.2
2001/0013894 A1 * 8/2001 Parulski et al. .............. 348/207

\* cited by examiner

*Primary Examiner*—Saeid Ebrahimi Dehkordy
(74) *Attorney, Agent, or Firm*—Fitzpatrick, Cella, Harper & Scinto

(57) ABSTRACT

In a system in which an image input apparatus and image forming apparatus are directly connected, the operation of the image input apparatus may stop during the operation of the image forming apparatus. The performance between the apparatuses is unbalanced, and the total throughput is low. According to this invention, in a system in which a plurality of apparatuses are connected via a serial bus, an apparatus having the node ID=0 upon bus reset in connection calculates a time required for each process in each apparatus for a plurality of processes forming a series of image processes. For a plurality of patterns (process roots) for distribution of image processing between the apparatuses, the processing time is calculated for each pattern. A series of image processes are executed based on a distribution pattern exhibiting the shortest time. In the image input apparatus, the format of image data to be transferred is switched in accordance with the empty state of a buffer in the image output apparatus. This enables efficient image forming processing in the system to increase the total throughput.

9 Claims, 36 Drawing Sheets

CROSS-SECTION OF CABLE

POWER-SOURCE LINE
8-40V DC, MAXIMUM CURRENT 1.5A

TWISTED PAIR
SIGNAL LINES

SIGNAL-LINE SHIELD

CLOCK : EXCLUSIVE-OR SIGNAL BETWEEN Data AND Strobe

BRANCH : NODE WITH TWO OR MORE NODE CONNECTIONS

LEAF : NODE WITH SINGLE PORT CONNECTION

▫ : PORT
c : PORT CORRESPONDING TO CHILD NODE
p : PORT CORRESPONDING TO PARENT NODE

FIG. 12
CSR CORE REGISTER

| OFFSET (hexadecimal) | REGISTER NAME | FUNCTION |
|---|---|---|
| 000 | STATE_CLEAR | INFORMATION ON STATUS AND CONTROL |
| 004 | STATE_SET | INFORMATION ON WRITE ENABLE/DISABLE STATUS OF STATE_CLEAR |
| 008 | NODE_IDS | BUS ID + NODE ID |
| 00C | RESET_START | TO RESET BUS BY WRITING INTO THIS AREA |
| 010~014 | INDIRECT_ADDRESS, INDIRECT_DATA | REGISTER TO ACCESS ROM AREA GREATER THAN 1KB |
| 018~01C | SPLIT_TIMEOUT | TIMER VALUE TO DETECT TIME-OUT OF SPLIT TRANSACTION |
| 020~02C | ARGUMENT, TEST_START, TEST_STATUS | REGISTER FOR DIAGNOSIS |
| 030~04C | UNITS_BASE, UNITS_BOUND, MEMORY_BASE, MEMORY_BOUND | NOT INSTALLED IN IEEE 1394 |
| 050~054 | INTERRUPT_TARGET, INTERRUPT_MASK | REGISTER OF INTERRUPTION NOTIFICATION |
| 058~07C | CLOCK_VALUE, CLOCK_TICK_PERIOD, CLOCK_STROBE_ARRIVED, CLOCK_INFO | NOT INSTALLED IN IEEE 1394 |
| 080~0FC | MESSAGE_REQUEST, MESSAGE_RESPONSE | REGISTER FOR MESSAGE NOTIFICATION |
| 100~17C | | RESERVATION |
| 180~1FC | ERROR_LOG_BUFFER | TO RESERVE FOR IEEE 1394 |

FIG. 13
SERIAL BUS REGISTER

| OFFSET (hexadecimal) | REGISTER NAME | FUNCTION |
|---|---|---|
| 200 | CYCLE_TIME | COUNTER FOR ISOCHRONOUS TRANSFER |
| 204 | BUS_TIME | REGISTER FOR TIME SYNCHRONIZATION |
| 208 | POWER_FAIL_IMMINENT | REGISTER RELATING TO POWER SUPPLY |
| 20C | POWER_SOURCE | |
| 210 | BUSY_TIMEOUT | TO CONTROL RETRY IN TRANSACTION LAYER |
| 214~218 | | RESERVATION |
| 21C | BUS_MANAGER_ID | NODE ID OF BUS MANAGER |
| 220 | BANDWIDTH_AVAILABLE | TO MANAGE ISOCHRONOUS TRANSFER BAND |
| 224~228 | CHANNELS_AVAILABLE | TO MANAGE CHANNEL NUMBER FOR ISOCHRONOUS TRANSFER |
| 22C | MAINT_CONTROL | REGISTER FOR DIAGNOSIS |
| 230 | MAINT_UTILITY | |
| 234~3FC | | RESERVATION |

FIG. 14

SERIAL-BUS NODE RESOURCE REGISTER

| OFFSET (hexadecimal) | REGISTER NAME | FUNCTION |
|---|---|---|
| 800~FFC | | RESERVATION |
| 1000~13FC | TOPOLOGY-MAP | INFORMATION ON SERIAL BUS STRUCTURE |
| 1400~1FFC | | RESERVATION |
| 2000~2FFC | SPEED-MAP | INFORMATION ON TRANSFER SPEED OF SERIAL BUS |
| 3000~FFFC | | RESERVATION |

FIG. 15

MINIMUM FORMAT CONFIGURATION ROM

| 01 | VENDOR ID |
|---|---|

FIG. 16

GENERAL FORMAT CONFIGURATION ROM

| LENGTH OF bus_info_block | LENGTH OF ROM | CRC |
|---|---|---|
| bus_info_block (ASCII CODE OF 1394 BUS AND INFORMATION ON WHETHER OR NOT NODE HAS CAPABILITIES OF ISOCHRONOUS RESOURCE MANAGEMENT, CYCLE MASTER, AND BUS MANAGEMENT) | | |
| root_directory (INDICATE VENDOR ID AND NODE FUNCTION) | | |
| unit_directories (INDICATE UNIT TYPE AND DRIVER SOFT VERSION) | | |
| root & unit_leaves | | |
| vendor_dependent_information | | |

REQUESTS FOR BUS ACCESS

BUS ACCESS GRANTED

ISOCHRONOUS DATA PACKET

FIG. 26

| ABBREVIATION | NAME | CONTENT |
|---|---|---|
| destination_ID | destination identifier | ID OF DESTINATION NODE (ASYNCHRONOUS ONLY) |
| tQ | transaction label | LABEL INDICATING A SERIES OF TRANSACTIONS (ASYNCHRONOUS ONLY) |
| rt | retry code | CODE INDICATING RETRANSMISSION STATUS (ASYNCHRONOUS ONLY) |
| tcode | transaction code | CODE INDICATING PACKET TYPE (ASYNCHRONOUS ONLY) |
| pri | priority | PRIORITY ORDER (ASYNCHRONOUS ONLY) |
| source_ID | source identifier | SOURCE NODE (ASYNCHRONOUS ONLY) |
| destination_offset | destination memory address | MEMORY ADDRESS OF DESTINATION NODE (ASYNCHRONOUS ONLY) |
| rcode | response code | RESPONSE STATUS (ASYNCHRONOUS ONLY) |
| quadiet_data | quadiet (4bytes) data | 4-BYTE LENGTH DATA (ASYNCHRONOUS ONLY) |
| data_length | length of data | LENGTH OF data_field (EXCEPT pad bytes) |
| extended_tcode | extended transaction code | EXTENDED TRANSACTION CODE (ASYNCHRONOUS ONLY) |
| chanel | isochronous identifier | IDENTIFICATION OF ISOCHRONOUS PACKET |
| sy | synchronization code | SYNCHRONIZATION OF VIDEO IMAGE AND AUDIO INFORMATION |
| cycle_time_data | contents of the CYCLE_TIME register | CYCLE TIMER REGISTER VALUE OF CYCLE MASTER NODE (CYCLE PACKET ONLY) |
| data_field | data + pad bytes | DATA STORAGE (ISOCHRONOUS AND ASYNCHRONOUS) |
| header_CRC | CRC for header field | CRC FOR HEADER |
| data_CRC | CRC for data field | CRC FOR DATA |
| tag | tag label | ISOCHRONOUS PACKET FORMAT |

IMAGE PROCESSING CONTROLLING DISTRIBUTION OF WORK AMONG APPARATUSES BASED ON APPARATUS PERFORMANCE

BACKGROUND OF THE INVENTION

Field of the Invention

The present invention relates to an image processing system, a control method therefor, and an image processing apparatus and, more particularly, to an image processing system in which an image input apparatus and image forming apparatus are connected to each other, a control method therefor, and an image processing apparatus.

With high-performance and low-end recent digital image processing apparatuses, an image processing system in which an image input apparatus such as a digital camera and an image forming apparatus such as a printer are connected to each other is becoming popular. In processing image data in such an image processing system, image data input by the image input apparatus is compressed, and the compressed data is transferred to the image forming apparatus via a predetermined interface. The image forming apparatus performs decompression and other image processes on the received compressed data, and then prints out the data.

In the conventional image processing system, however, the total processing time (to be referred to as "throughput" hereinafter) required from the input of an image to the end of printing mainly depends on the data transfer time, and the image processing time and printing processing time at the image forming apparatus side. Processing in the image input apparatus hardly influences the total throughput.

This means that the operation of the image input apparatus stops during the operation of the image forming apparatus. The performance between the apparatuses constituting the system is, thus, unbalanced.

SUMMARY OF THE INVENTION

The present invention has been proposed to solve the foregoing conventional problems, and has as its object to provide an image processing system which is constituted by connecting an image input apparatus and image forming apparatus to each other, and increases the total throughput, a control method therefor, and an image processing apparatus.

According to the present invention, the foregoing object is attained by providing an image processing system in which first and second image processing apparatuses are connected via a serial bus, where the first image processing apparatus comprises control means for controlling distribution of image processing between the two apparatuses on the basis of performance of the first image processing apparatus and performance of the second image processing apparatus.

In accordance with the present invention as described above, the load of each apparatus can be distributed with good balance.

According to the present invention, the foregoing object is attained by providing an image processing system in which first and second image processing apparatuses are connected via a serial bus, where the first and second image processing apparatuses respectively comprise first and second control means for controlling distribution of image processing between the two apparatuses, and determine which of the first and second control means acquires control.

In accordance with the present invention as described above, which of the apparatuses acquires control of processing distribution can be appropriately determined.

According to the present invention, the foregoing object is attained by providing an image processing system in which first and second image processing apparatuses are connected via a serial bus, where image data processed in the first image processing apparatus is stored in storage means under management of the serial bus, and the second image processing apparatus selects either of the image data stored in the storage means and image data processed by the second image processing apparatus.

In accordance with the present invention as described above, image data processed by either of the respective apparatuses can be selected.

According to the present invention, the foregoing object is attained by providing an image processing system in which an image input apparatus and an image output apparatus are connected via a serial bus, wherein the image input apparatus comprises input means for inputting image data of a first format, determination means for determining whether to convert the image data of the first format into a second format, first conversion means for converting the image data of the first format into the second format on the basis of a determination result, and first communication means for transmitting the image data of the first or second format to the image output apparatus, and the image output apparatus comprises second communication means for receiving the image data transferred from the image input apparatus, holding means for temporarily holding the received image data in a buffer having a predetermined capacity, second conversion means for, if the image data held in the buffer has the first format, converting the image data into the second format; and output means for sequentially outputting the image data of the second format.

In accordance with the present invention as described above, the format of transfer data between the apparatuses can be properly changed.

The invention is particularly advantageous that the total throughput increases in the image processing system in which the image input apparatus and image forming apparatus are directly connected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a table showing functions of a CSR architecture of the 1394 serial bus;

FIG. 13 is a table showing registers for the 1394 serial bus;

FIG. 14 is a table showing registers for node resources of the 1394 serial bus;

FIG. 15 is an example of a minimum format of a configuration ROM of the 1394 serial bus;

FIG. 16 is an example of a general format of the configuration ROM of the 1394 serial bus;

FIG. 26 is a table showing the details of packet format fields for the isochronous transfer in a 1394 serial bus;

DETAILED DESCRIPTION OF THE PREFERRED EMBODIMENTS

The preferred embodiments of the present invention will now be described in detail in accordance with the accompanying drawings.

First Embodiment

Figure 1:
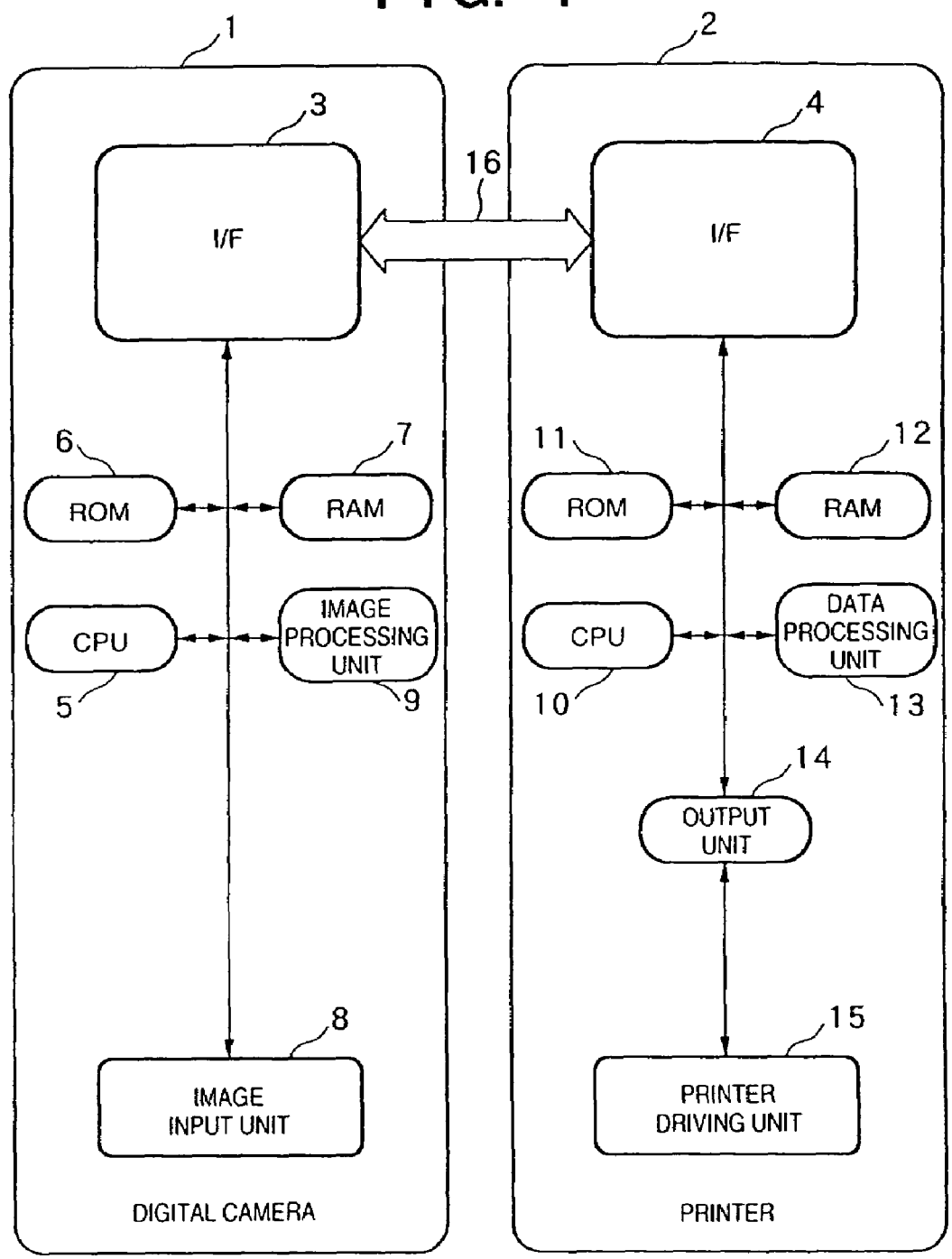
FIG. 1 is a block diagram showing the arrangement of an image processing system to which the present invention is applied.

FIG. 1 is a block diagram showing the arrangement of an image processing system to which the present invention is applied. Reference numeral 1 denotes a digital camera for inputting image data; and 2, a printer for printing out the image data input from the digital camera 1. The digital camera 1 and printer 2 are directly connected via a cable 16 by their interfaces (I/Fs) 3 and 4 defined by IEEE 1394.

The digital camera 1 is constituted by a CPU 5 for integrally controlling image input processing, a ROM 6 storing control programs executed by the CPU 5, a RAM 7 for temporarily storing data, an image input unit 8 for actually inputting image data, an image processing unit 9 for processing the input image data, the I/F 3 and the like.

The printer 2 is composed of a CPU 10 for integrally controlling printing processing, a ROM 11 storing control programs executed by the CPU 10, a RAM 12 for temporarily storing data, a data processing unit 13 for processing printing data, an output unit 14 for transferring the processing result to a printer driving unit 15, the printer driving unit 15 for performing actual printing processing, the I/F 4 and the like.

Figure 2:
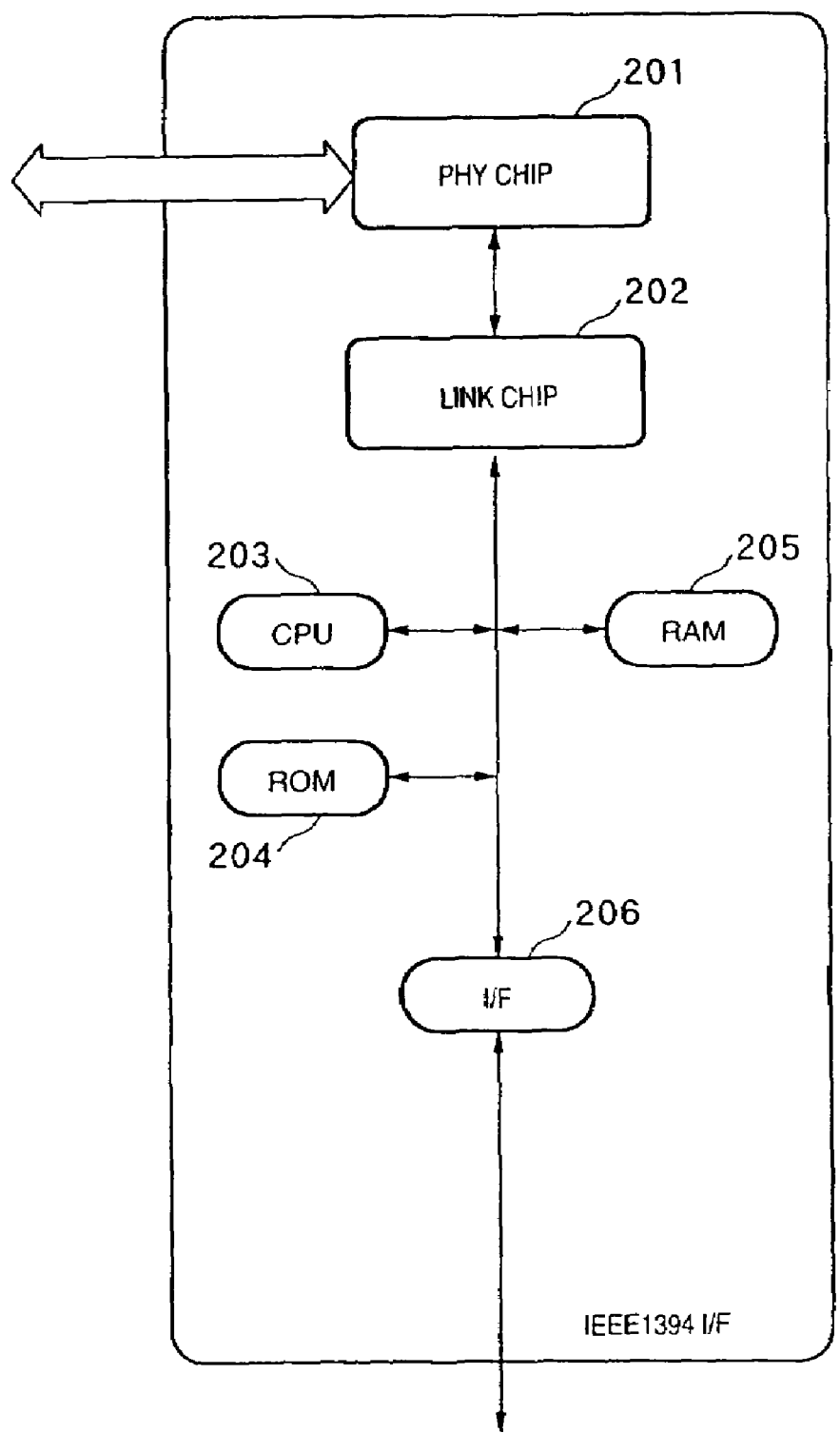
FIG. 2 is a block diagram showing the detailed arrangement of an IEEE 1394 I/F in an embodiment.

The I/Fs 3 and 4 in the digital camera 1 and printer 2 have the same arrangement, and their detailed block arrangement is shown in FIG. 2.

In FIG. 2, reference numeral 201 denotes a PHY chip (physical layer chip) having a data transfer/input/output function as an operation in the physical layer, an arbitration function, a transmission data encoding/decoding function and the like; 202, a LINK chip (link layer chip) having an asynchronous data transfer function as an operation in the link layer, an isochronous data transfer support function and the like; 203, a CPU for controlling the entire I/F; 204, a ROM storing control programs and the like; 205, a RAM for temporarily storing data; and 206, an I/F for connecting the I/F 3 or 4 to the internal bus of the digital camera 1 or printer 2.

This embodiment assumes data communication using an interface (to be referred to as a "1394 serial bus") defined by the IEEE 1394-1995 standard (to be referred to as an "IEEE 1394"). The outline of the 1394 serial bus will be described below. Details of the IEEE 1394 standard are described in "IEEE Standard for a High Performance Serial Bus" published by IEEE (The Institute of Electrical and Electronics Engineers, Inc.), Aug. 30, 1996.

[Outline of 1394 Serial Bus]

With the appearance of general digital video cam recorder (VCR) and digital video disk (DVD) player, there is a need for transferring realtime and large amount data such as video data and audio data (hereinafter referred to as "AV data"). To transfer AV data in realtime to a personal computer (PC) or other digital devices, an interface capable of high-speed data transfer is required. The 1394 serial bus has been developed from the above point.

Figure 3:
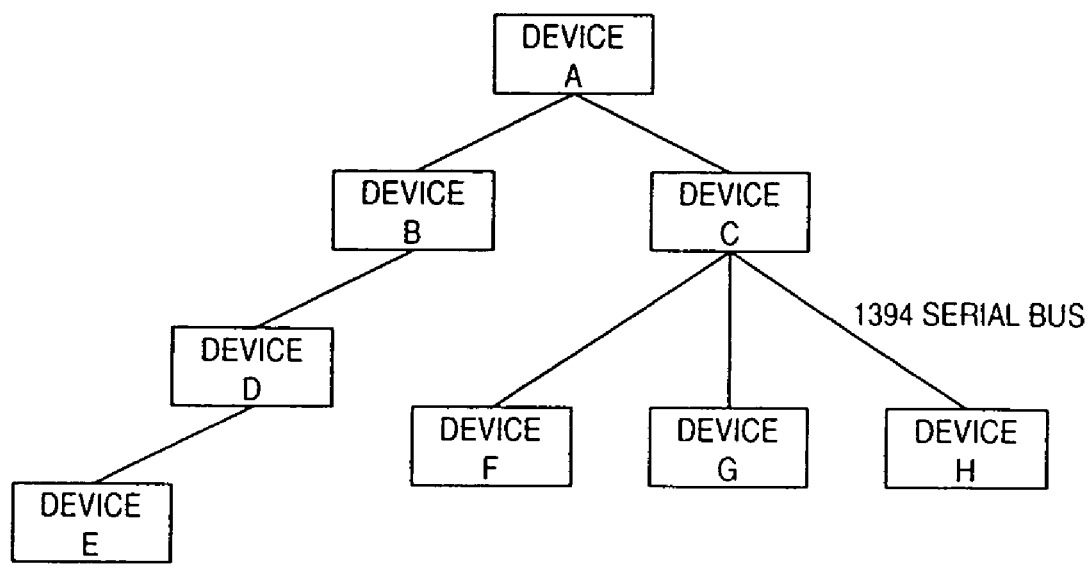
FIG. 3 is a block diagram showing an example of a network system constructed with an IEEE 1394 serial interface.

FIG. 3 shows an example of a network system constructed with a 1394 serial bus. This system comprises devices A to H, and the devices A and B, the devices A and C, the devices B and D, the devices D and E, the devices C and F, the devices C and G, and the device C and H are respectively connected by a twisted pair cable for the 1394 serial bus. These devices A to H may be computers such as a personal computer, or most computer-peripheral devices such as a digital VCR, a DVD player, a digital still camera, a storage device using a storage medium such as a hard disk or an optical disk, a monitor such as a CRT or an LDC, a tuner, an image scanner, a film scanner, a printer, a MODEM, and a terminal adapter (TA). Note that the printing method of the printer may be any method, e.g., a laser-beam printing, an electrophotographic method using an LED, an ink-jet method, a thermal-transfer method of ink melting or ink sublimation type and a thermo-sensitive printing method.

The connection between the devices may be made by mixedly using a daisy chain method and a node branching method, thus realizing high-freedom of connecting. The respective devices have an ID, and they construct a network by identifying each ID within a range connected by the 1394 serial bus. For example, the devices respectively take a relaying role only by daisy-chain connecting the devices with cables for the 1394 serial bus, thus constructing a network.

As the 1394 serial bus corresponds to a Plug and Play function, it automatically recognizes a device connected to the cable, thus recognizes connection status. In the system as shown in FIG. 3, when a device is removed from the network, or a new device is added to the network, the bus is automatically reset (i.e., the current network constructing information is reset), and a new network is constructed. This function enables realtime setting and recognition of network construction.

The 1394 serial bus has a data transfer speed defined as 100/200/400 Mbps. A device having a high transfer speed supports a lower transfer speed, thus maintaining compatibility. As data transfer modes, an asynchronous transfer mode (ATM) for transferring asynchronous data such as a control signal, an isochronous transfer mode for transferring isochronous data such as realtime AV data are available. In data transfer, within each cycle (generally 125 μs/cycle), a cycle start packet (CSP) indicating the start of cycle is transferred, and then asynchronous and isochronous data are mixedly transferred such that the isochronous data transfer is transferred prior to the asynchronous data.

Figure 4:
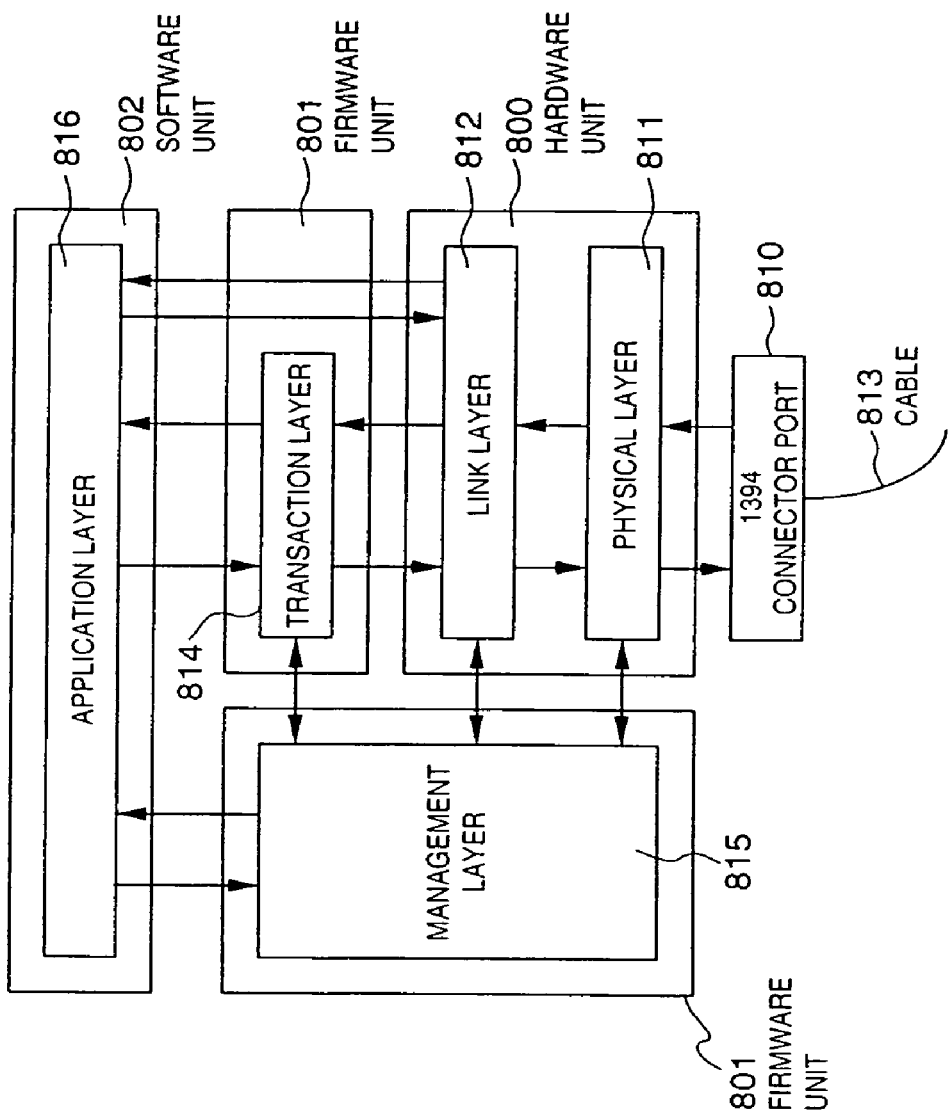
FIG. 4 is a block diagram showing the construction of the IEEE 1394 serial interface.

FIG. 4 shows the construction of the 1394 serial bus, as a layer structure. As shown in FIG. 4, a connector port 810 is connected to a connector at the end of a cable 813 for the 1394 serial bus. A physical layer 811 and a link layer 812 in a hardware unit 800 are positioned as upper layers with respect to the connector port 810. The hardware unit 800 comprises interface chips. The physical layer 811 performs coding, connection-related control and the like, and the link layer 812, packet transfer, cycle-time control and the like.

In a firmware unit 801, a transaction layer 814 manages data to be transferred (transaction data), and outputs commands Read, Write and Lock. A management layer 815 in the firmware unit 801 manages connection statuses and ID's of the respective devices connected to the 1394 serial bus, thus manages the network construction. The above hardware and firmware units substantially constructs the 1394 serial bus.

In a software unit 802, an application layer 816 differs in software used by the system, and the data transfer protocol indicating how to transfer data on the interface is defined by a protocol such as a printer protocol or an AVC protocol.

Figure 5:
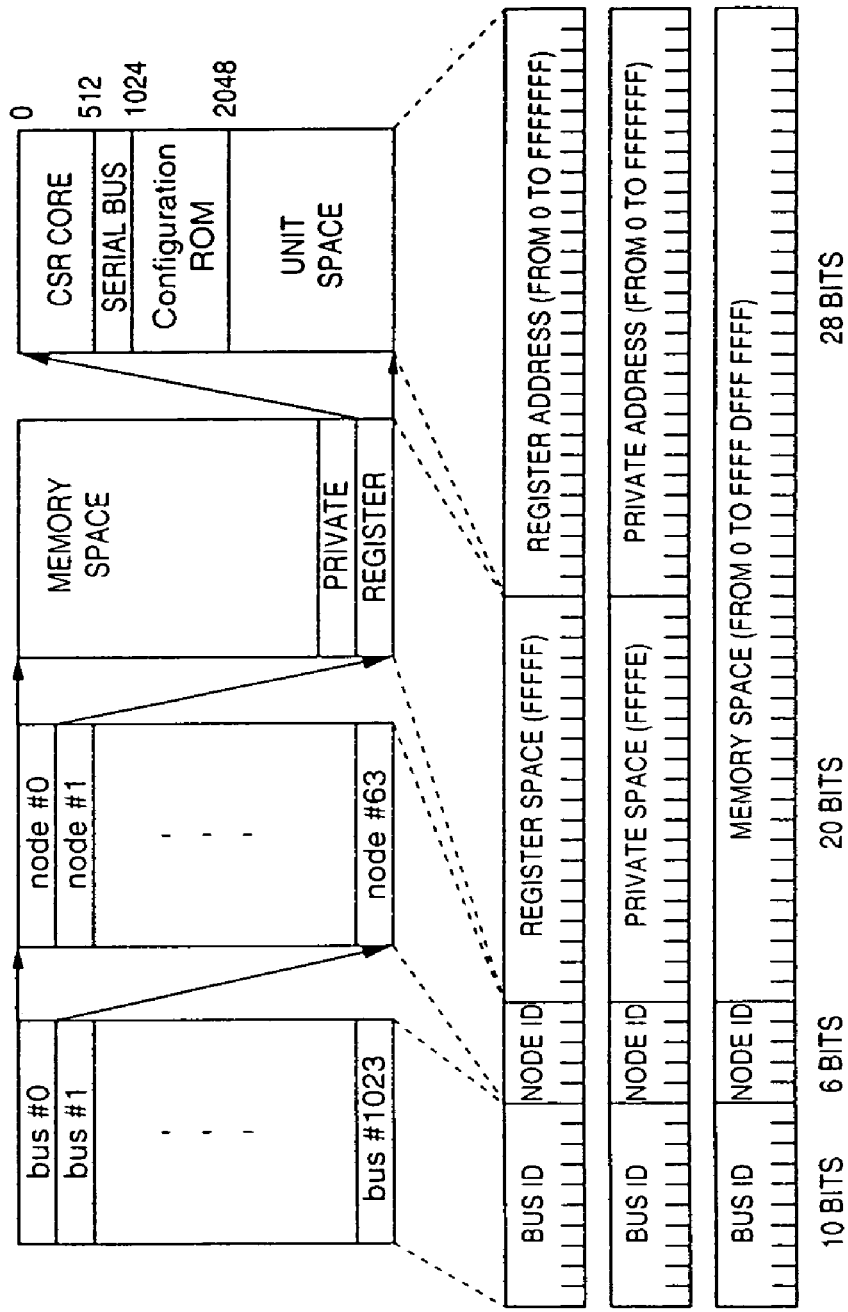
FIG. 5 is an explanatory view showing address space of the IEEE 1394 serial interface.

FIG. 5 shows the address space of the 1394 serial bus. All the devices (nodes) connected to the 1394 serial bus have a unique 64 bit address. The 64 bit address is stored in a memory of the devices. Data communication with a designated destination device can be performed by always recognizing the node addresses of the transmitting- and receiving-side nodes.

Addressing of the 1394 serial bus is made based on the IEEE 1212 standards, such that first 10 bits are allocated for designating a bus number, then next 6 bits are allocated for designating an node ID.

48-bit address used in the respective devices are divided into 20 bits and 28 bits, and utilized in the unit of 256 Mbytes. In the initial 20-bit address space, "0" to "0xFFFFD" is called a memory space; "0xFFFFE", a private space; "0xFFFFF", a register space. The private space is an address freely used in the device. The register space, holding information common to the devices connected with the bus, is used for communication among the respective devices.

In the register space, the initial 512 bytes are assigned to a register core (CSR core) as a core of a Command/Status Register (CSR) architecture; the next 512 bytes, to a register of the serial bus; the next 1024 bytes, to a configuration ROM; and the remaining bytes, to a register unique to the device in a unit space.

Generally, for the sake of simplification of bus system design for different node types, it is preferable that only the initial 2048 bytes are used for the nodes, and as a result, total 4096 bytes are used including the initial 2048 bytes for the CSR core, the register of the serial bus, the configuration ROM and the unit space.

The 1394 serial bus has the construction as described above. Next, the features of the 1394 serial bus will be described in more detail.

[Detailed Description of 1394 Serial Bus]

[Electrical Specification of 1394 Serial Bus]

Figure 6:
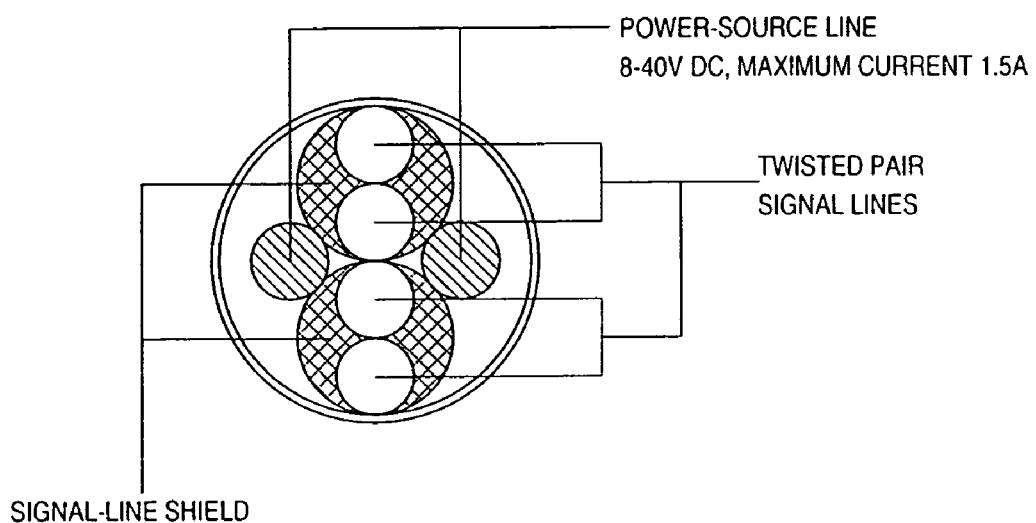
FIG. 6 is a cross-sectional view showing a cable for the IEEE 1394 serial interface.

FIG. 6 shows a cross-section of the cable of the 1394 serial bus. The 1394 serial cable comprises two sets of twisted pair signal lines and two power-source lines. This construction enables power supply to a device which lacks a power source, or a device where a voltage is degraded due to a failure or the like. The direct-current voltage supplied by the power-source lines is 8 to 40V; the current is a maximum of 1.5 A. Note that in the standards for so-called DV cable, four lines apart from the power-source line constitute the cable.

[DS-Link]

Figure 7:
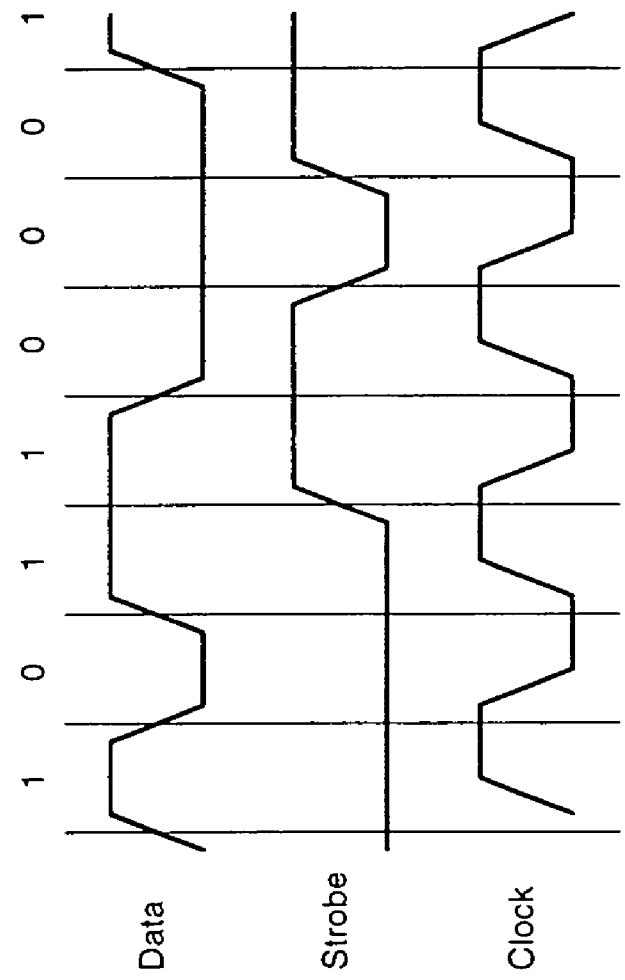
FIG. 7 is a timing chart explaining a Data/Strobe Link method.

FIG. 7 is a timing chart explaining a DS-Link (Data/Strobe-Link) method as a data transfer method.

The DS-Link method, appropriate for high-speed serial data communication, requires two sets of two signal lines. That is, one of the two sets of twisted-pair signal lines is used for sending a data signal, and the other one set of twisted-pair signal lines is used for sending a strobe signal. On the receiving side, an EXCLUSIVE-OR between the data signal and the strobe signal is obtained so as to generate a clock signal. In the DS-Link transfer, it is unnecessary to mix a clock signal into a data signal, therefore, transfer efficiency is higher than that in other serial-data transfer methods. Further, as a clock signal is generated from the data signal and the strobe signal, a phase locked loop (PLL) circuit can be omitted, which attains downsizing of the scale of a controller LSI. Further, in the DS-Link transfer, it is unnecessary to send information indicative of idle status when there is no data to be transferred, therefore, a transceiver of each device can be set in a sleep status, which reduces electric consumption.

[Bus-Reset Sequence]

The respective devices (nodes) connected to the 1394 serial bus are provided with a node ID, and are recognized as nodes constructing the network. For example, when increase/decrease of the number of nodes due to connection/disconnection or power ON/OFF status of network devices, i.e., network construction changes and it is necessary to recognize a new network construction, the respective nodes detect the change of network construction, send a bus-reset signal onto the bus, and enter a mode for recognizing the new network construction. The detection of change of network construction is made by detecting change of bias voltage at the connector port 810.

When the bus-reset signal is sent from one node, the physical layer 811 of the respective nodes receives the bus-reset signal, and at the same time, notifies the link layer 812 of the occurrence of bus reset, and forwards the bus-reset signal to the other nodes. When all the nodes have received the bus-reset signal, a bus-reset sequence is started. Note that the bus-reset sequence is started when the cable is attached/detached, or the hardware unit 800 has detected network abnormity or the like. Further, the bus-reset sequence is also started by a direct instruction to the physical layer 811 such as host control by a protocol. As the bus-reset sequence is started, data transfer is suspended during the bus reset, and after the bus reset, the data transfer is restarted in the new network construction.

[Node-ID Determination Sequence]

Figure 8:
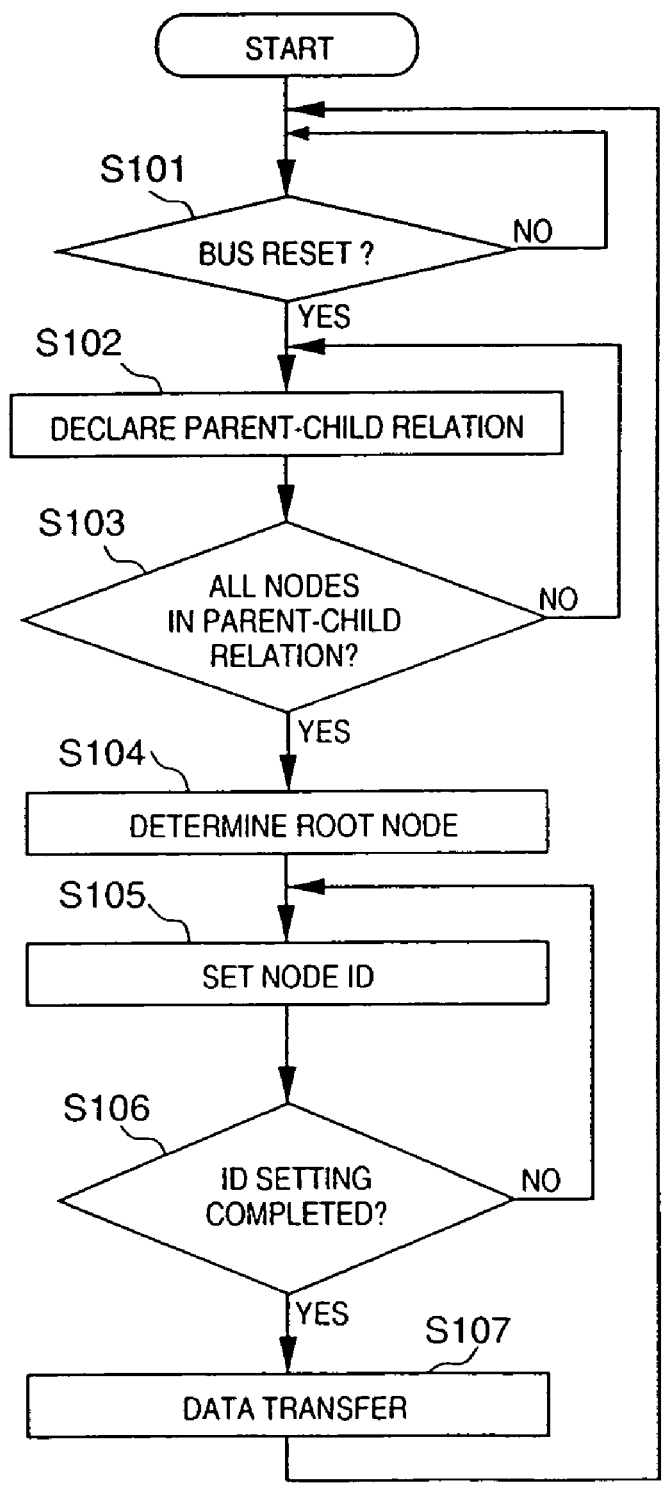
FIGS. 8 to 10 are flowcharts showing a procedure of network construction in the IEEE 1394 serial interface.

After the bus reset, the respective nodes start to obtain a node ID so as to construct a new network construction. A general sequence from the bus reset to node-ID determination will be described with reference to the flowcharts of FIGS. 8 to 10. FIG. 8 is a flowchart showing a sequence from occurrence of bus-reset signal to node-ID determination and data transfer. In step S101, the respective nodes always monitor occurrence of bus-reset signal. When the bus-reset signal has occurred, the process proceeds to step S102, in which, to obtain a new network construction in a situation where the network construction has been reset, a parent-child relation is declared between nodes connected to each other. Step S102 is repeated until it is determined in step S103 that the parent-child relation has been determined among all the nodes.

As the parent-child relation has been determined, the process proceeds to step S104, in which one "root" (node) is determined. In step S105, node-ID setting is performed so as to provide an ID to the respective nodes. The node-ID setting is made in a predetermined order of the nodes. Step S105 is repeated until it is determined in step S106 that the ID's have been given to all the nodes.

As the node-ID setting has been completed, since the new network construction has been recognized by all the nodes, data transfer among the nodes is possible. In step S107, data transfer is started, and the process returns to step S101, in which occurrence of bus-reset signal is monitored again.

Figure 9:
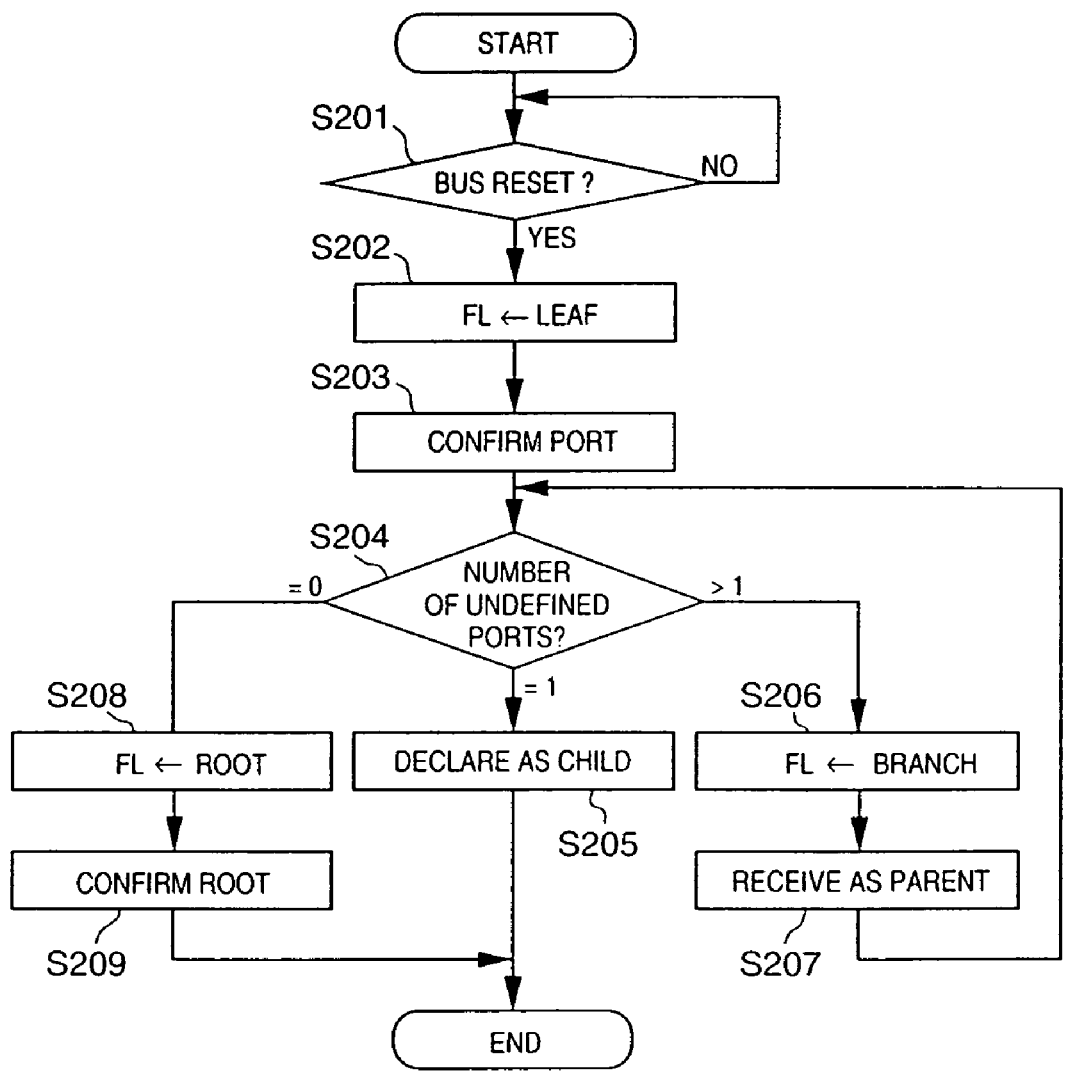
Figure 10:
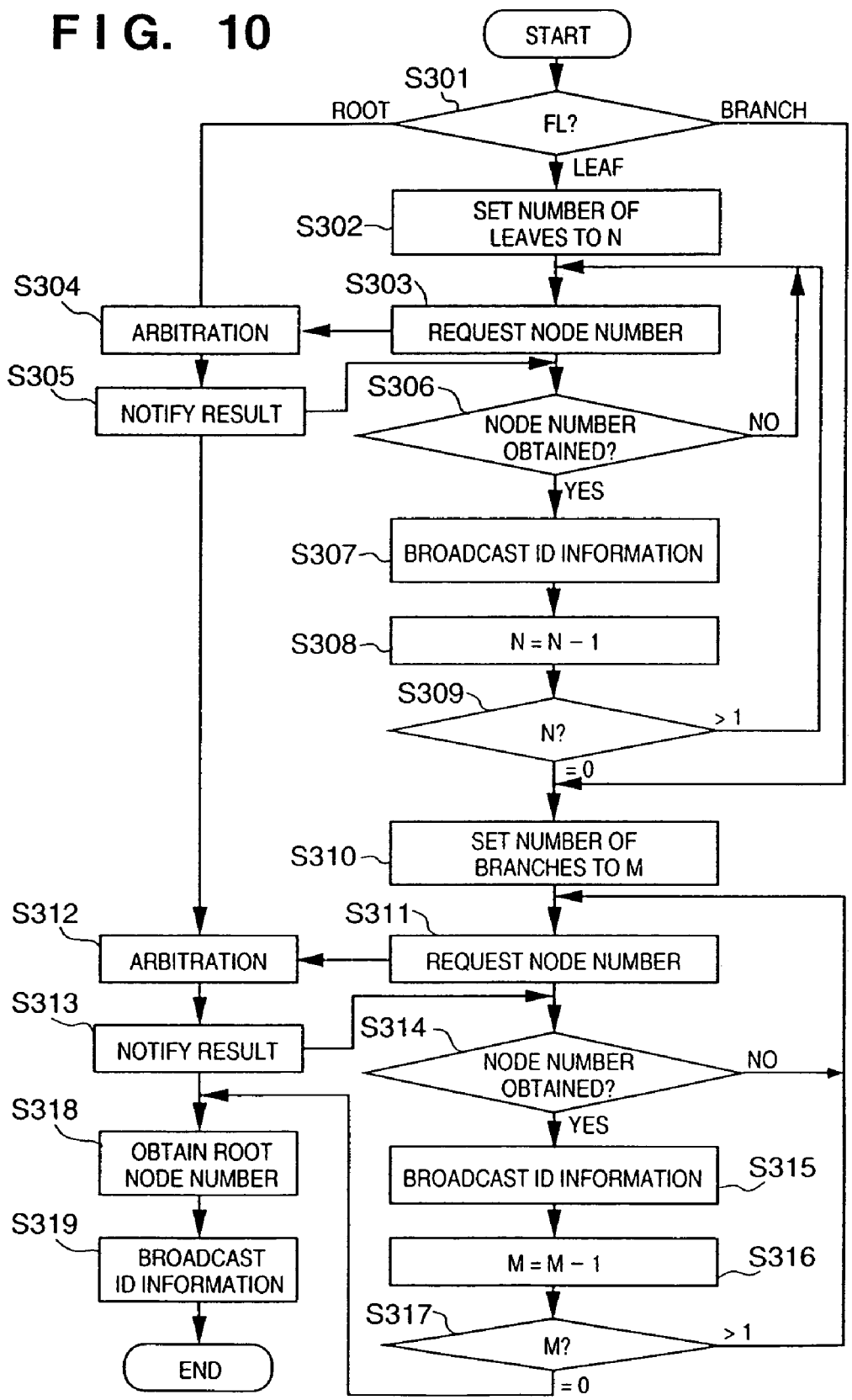

FIG. 9 is a flowchart showing the sequence from the monitoring of bus-reset signal (S101) to the root determination (S104) in detail. FIG. 10 is a flowchart showing the node-ID setting (S105 and S106) in detail.

In FIG. 9, in step S201, the occurrence of bus-reset signal is monitored, and as the bus-reset signal has occurred, the network construction is reset. Next, in step S202 (a first step for re-recognizing the reset network construction), the respective devices reset its flag FL with data indicative of "leaf" (node). In step S203, the respective devices examine the number of ports, i.e., the number of other nodes connected to them. In step S204, based on the result of examination in step S203, the devices examine the number of undefined (i.e., parent-child relation has not been determined) ports. The number of undefined ports is equal to that of the ports immediately after the bus reset, however, with the progress of determination of parent-child relation, the number of undefined ports detected in step S204 decreases.

Only an actual leaf can declare parent-child relation immediately after the bus reset. Whether or not the node is a leaf is detected from the number of ports examined in step S203; i.e., if the number of ports is "1", the node is a leaf. The leaf declares that "this node is a child, and the connected node is a parent" in step S205, then terminates the operation.

On the other hand, a node that detected in step S203 that the number of ports is "two or more" is a "branch". Immediately after the bus reset, as "undefined ports >1" holds, the process proceeds to step S206, in which the flag FL is set with data indicative of "branch", then declaration of parent-child relation from another node is waited in step S207. When the parent-child relation is declared from another node, the process returns to step S204, in which the branch examines the number of undefined ports. If the number of undefined ports is "1", the branch can declare in step S205 that "this node is a child, and the connected node is a parent" to the node connected to the remaining port. If the number of undefined ports is still "two or more", the branch waits for declaration of parent-child relation from another node in step S207.

When any one of the branches (or exceptionally any leaves which have delayed declaring a child) detects that the number of undefined ports is "0", the parent-child declaration of the overall network has been completed. The only one node that has "0" undefined port, i.e., the parent of all the nodes, sets the flag FL with data indicative of a "root" in step S208. Then in step S209, the node is recognized as a root.

In this manner, the procedure from the bus reset to the parent-child declaration among all the nodes in the network ends.

Next, a procedure of providing each node with an ID will be described. First, the ID setting is performed at the leaves. Then, IDs are set in numerical order (from node number: 0) from leaves→branches→root.

In FIG. 10, in step S301, the process splits in accordance with node type, i.e., leaf, branch or root, based on the data set at the flags FL.

In the case of a leaf, in step S302, the number of leaves (a natural number) in the network is set to a variable N. In step S303, the respective leaves request a node number from the root. If a plurality of requests have been made, the root performs arbitration in step S304, and provides a node number to one node in step S305, while notifies notifying the other nodes of the result of acquisition of node-number (S307) indicating that the node number has been failed.

A leaf that has not obtained a node number (NO in step S306) repeats the request for a node number in step S303. On the other hand, a leaf that has obtained a node number notifies all the nodes of the obtained node number by broadcasting ID information including the node number. As the broadcasting of the ID information has been completed, the variable N indicative of the number of leaves is decremented in step S308. Then, from the determination in step S309, the procedure from step S303 to step S308 is repeated until the variable N becomes "0" in the determination in step S309. When ID information on all the leaves have been broadcasted, the process proceeds to step S310, for setting IDs of branches.

The ID setting for branches is performed substantially similar to the ID setting for the leaves. First, in step S310, the number of branches (a natural number) is set to a variable M. In step S311, the respective branches ask the root for a node number. In response to the requests, the root performs arbitration in step S312, and provides a node number, subsequent to the last leaf node number, to a branch in step S313, while notifying the other branches of the result of acquisition of node-number (S315) indicating that the node number has been failed.

A branch that has not obtained a node number (NO in step S314) repeats the request for a node number in step S311. On the other hand, a branch that has obtained a node number notifies all the nodes of the obtained node number by broadcasting ID information including the node number. As the broadcasting of the ID information has been completed, the variable M indicative of the number of branches is decremented in step S316. Then, from the determination in step S317, the procedure from step S311 to step S316 is repeated until the variable M becomes "0" in the determination in step S317. When ID information on all the leaves have been broadcasted, the process proceeds to step S318, for setting the ID of the root.

At this time, it is only the root that has not obtained a node ID. In step S318, the root obtains the smallest number that has not been provided to any other node as the node ID of the root, and in step S319, broadcasts ID information on the root.

As described above, the procedure until the node IDs for all the nodes have been set, ends. Next, the sequence of node ID determination will be described with reference to the network example shown in FIG. 11.

Figure 11:
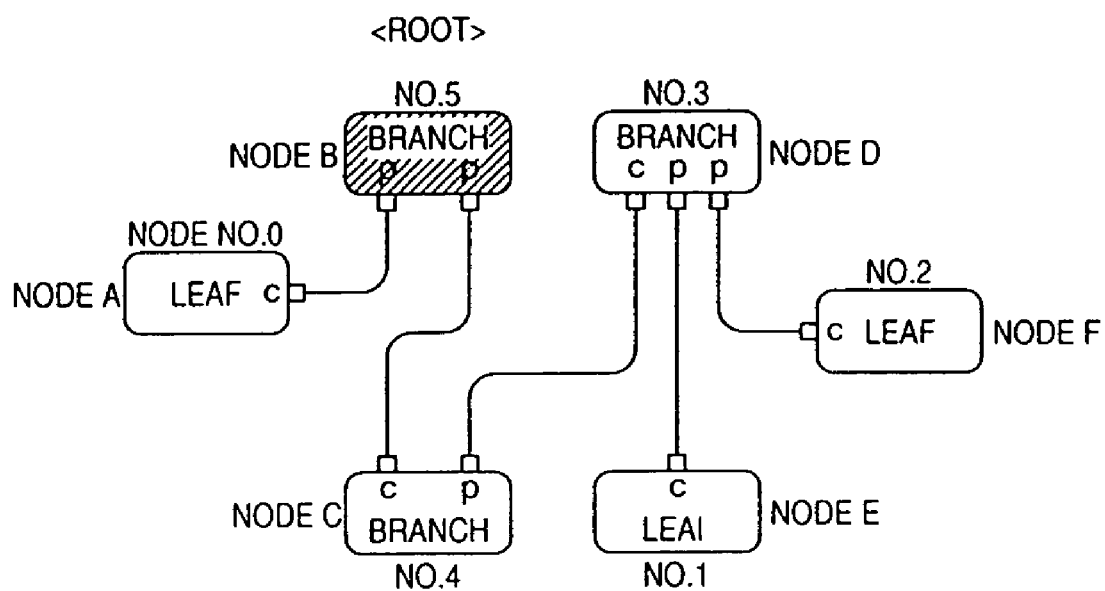
FIG. 11 is a block diagram showing an example of the network.

In the network in FIG. 11, a node B (a roots is directly connected to its lower nodes A and C; the node C is directly connected to its lower node D; and the node D is directly connected to its lower nodes E and F. The procedure of determining this hierarchical structure, the root node and the node IDs will be described below.

After the bus reset has occurred, to recognize connection statuses of the respective nodes, parent-child relation is declared between ports of directly connected nodes. "Parent" means a node at an upper level, and "child" means a node at a lower level in the hierarchical structure. In FIG. 11, the node that first declared parent-child relation after the bus reset is the node A. As described above, nodes (leaves) where only one port is connected can start declaration of a parent-child relation. That is, if the number of ports is "1", it is recognized that the node is at an end of the network tree, i.e., a leaf. The declaration of a parent-child relation is started from the leaf which has first taken action among these leaves. Thus, a port of the leaf node is set as a "child", while the port of another node connected to the leaf node is set as a "parent". In this manner, the "child-parent" relation is sequentially set between the nodes A and B, between the nodes E and D, and between the nodes F and D.

Further, among upper nodes having a plurality of ports, i.e., branches, a parent-child relation is sequentially declared with respect to upper node(s), from the node that first received declaration of parent-child relation from the leaf. In FIG. 11, first a parent-child relation is determined between the nodes D and E and between the nodes D and F. Then the node D declares a parent-child relation with respect to the node C, and as a result, a relation "child-parent" is set between the nodes D and C. The node C, that has received the declaration of parent-child relation from the node D, declares parent-child relation with respect to the node B connected to the other port, and thus "child-parent" relation is set between the nodes C and B.

In this manner, the hierarchical structure as shown in FIG. 11 is constructed. The node B, that has finally become the parent at all the ports, is determined as a root. Note that a network has only one root. In a case where the node B that has received declaration of parent-child relation from the node A immediately declares a parent-child relation with respect to another node, the other node, e.g., the node C, may be the root node. That is, any node may be a root depending upon the timing at which a declaration of a parent-child relation is transmitted, and further, even in a network maintaining the same construction, a particular node is not always become a root.

As the root has been determined, the sequence of determining the respective node IDs is started. Each node has a broadcast function to notify its ID information to all the other nodes. ID information includes a node number, information on a connected position, the number of ports, the number of ports connected to other nodes, information on parent-child relation on the respective ports and the like.

As described above, the assignment of node numbers is started from the leaves. In numerical order, node number=0, 1, 2, . . . is assigned. Then, by the broadcasting of ID information, it is recognized that the node number has been assigned.

As all the leaves have obtained a node number, node numbers are assigned to the branches. Similar to the assignment of node numbers to the leaves, ID information is broadcasted from the branch that received a node number, and finally, the root broadcasts its ID information. Accordingly, the root always has the greatest node number.

Thus, as the ID setting of the overall hierarchical structure has been completed and the network has been constructed, then the bus initialization is completed.

[Control Information for Node Management]

The CSR core as shown in FIG. 5 exists on the register as a basic function of the CSR architecture for node management. FIG. 12 shows the positions and functions of the registers. In FIG. 12, the offset is a relative position from "0xFFFFF0000000".

In the CSR architecture, the register for the serial bus is arranged from "0xFFFFF0000200". FIG. 13 shows the positions and functions of the registers.

Further, information on node resources of the serial bus is arranged from "0xFFFFF0000800". FIG. 14 shows the positions and functions of the registers.

The CSR architecture has a configuration ROM for representing functions of the respective nodes. The configuration ROM has a minimum format and a general format, arranged from "0xFFFFF0000400". As shown in FIG. 15, the minimum format configuration ROM merely shows a vendor ID which is a unique numerical value represented by 24 bits.

As shown in FIG. 16, the general format configuration ROM has information on a node. In this case, the vendor ID in this format is included in a "root directory". Further, "bus_info_block" and "root&unit_leaves" include unique device number including the vendor ID, represented by 64 bits. The device number is used after network reconstruction by bus reset operation, to continue recognition of the node.

[Serial Bus Management]

As shown in FIG. 4, the protocol of the 1394 serial bus comprises a physical layer 811, a link layer 812 and a transaction layer 814. This provides, as the serial bus management, a basic function for node management and bus resource management, based on the CSR architecture.

Only one node which performs bus management (hereinafter referred to as "bus management node") exists on a given bus, and provides the other nodes on the serial bus with a management function which includes cycle master control, performance optimization, power source management, transmission speed management, construction management and the like.

The bus management function briefly divides into a bus manager, an isochronous resource manager and a node control function. The node control is a management function which enables communication among the nodes in the physical layer 811, the link layer 812, the link layer 812, the transaction layer 814 and an application program by the CSR. The isochronous resource manager, which is a management function necessary for isochronous-type data transfer on the serial bus, manages assignment of transfer bandwidth and channel number to isochronous data. For this management, after bus initialization, the bus management node is dynamically selected from nodes having the isochronous resource manager function.

Further, in a construction without a bus management node on the bus, a node having the isochronous resource manager function performs a part of the bus management such as the power source management and cycle master control. Further, the bus management is a management function as service to provide a bus control interface to an application program. The control interface uses a serial-bus control request (SB_CONTROL.request), a serial-bus event control confirmation (SB_CONTROL.confirmation) and a serial-bus event indication (SB_EVENT.indication).

The serial-bus control request is used when an application program requires the bus management node to perform bus reset, bus initialization, representation of bus-status information, and the like. The serial-bus event control confirmation is the result of the serial-bus control request, and is notified from the bus management node to the application for confirmation. The serial-bus event control confirmation is made as notification of an synchronously-caused event from the bus management node to the application.

[Data Transfer Protocol]

The data transfer using the 1394 serial bus simultaneously sends isochronous data (isochronous packet) which must be periodically transmitted, and asynchronous data (asynchronous packet) which can be transmitted/received at arbitrary timing, further, ensures real-time transmission of isochronous data. In the data transfer, a bus use right is requested prior to transfer, and bus arbitration is performed to obtain bus use permission.

In the asynchronous transfer, a transmitting node ID and a receiving node ID are sent with transfer data as packet data. The receiving node confirms the receiving node ID, i.e., its node ID, receives the packet, and returns an acknowledge signal to the transmitting node. Thus, one transaction is completed.

In the isochronous transfer, a transmitting node requires an isochronous channel with a transmission speed, and a channel ID is sent with transfer data as packet data. A receiving node confirms a desired channel ID and receives the data packet. The necessary channel number and transmission speed are determined by the application layer 816.

These transfer protocols are defined by the physical layer 811, the link layer 812 and the transaction layer 813. The physical layer 811 performs physical and electrical interface with the bus, automatic recognition of node connection, bus arbitration for a bus use right among nodes, and the like. The link layer 812 performs addressing, data checking, packet transmission/reception and cycle control for isochronous transfer. The transaction layer 814 performs processing relating to asynchronous data. Hereinbelow, the processings in the respective layers will be described.

[Physical Layer]

The bus arbitration in the physical layer 811 will be described.

The 1394 serial bus always performs arbitration of bus use right prior to data transfer. The devices connected to the 1394 serial bus respectively relay a signal transferred on the network, thus constructing a logical bus-type network transmitting the signal to all the devices within the network. This necessitates bus arbitration to avoid packet conflict. As a result of bus arbitration, one node can transfer data during a certain period.

Figure 17:
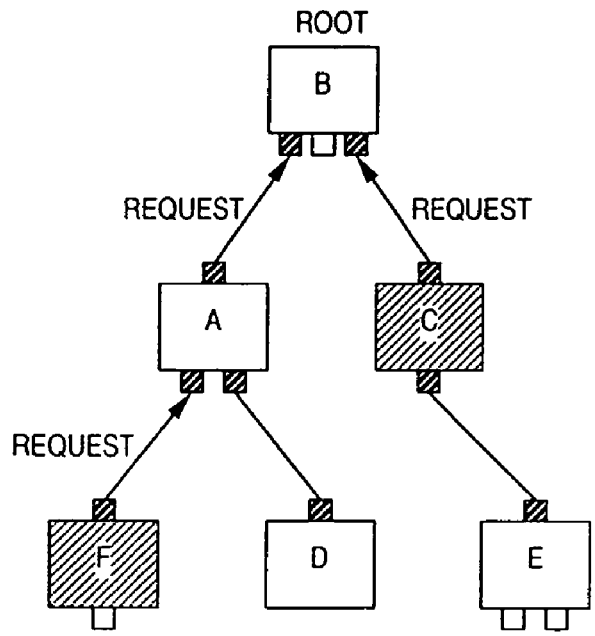
FIG. 17 is a block diagram explaining bus arbitration.
Figure 18:
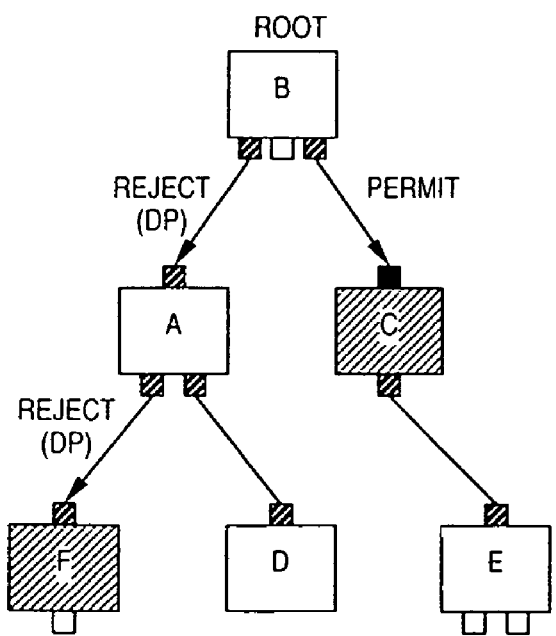
FIG. 18 is a block diagram explaining bus arbitration.

FIGS. 17 and 18 are block diagrams explaining the bus arbitration. FIG. 17 shows operation to request a bus use right; and FIG. 18, operation to allow to use the bus. When the bus arbitration is started, a single or plurality of nodes respectively request a bus use right to use the bus from its parent node. In FIG. 17, the nodes C and F request a bus use right. The parent node (node A in FIG. 17) that has received the request relays the request by further requesting a bus use right from its parent node. The request is forwarded to a root (node B in FIG. 17) that finally performs arbitration.

The root that has received the request for bus use right determines a node to be provided with the bus use right. This arbitration can be performed only by the root. The node that dominated in the arbitration is provided with the bus use right. FIG. 18 shows that the node C has obtained the bus use right and the request from the node F has been rejected.

The root sends a DP (data prefix) packet to nodes lost in the bus arbitration so as to notify that their requests have been rejected. The requests from those nodes are held by the next bus arbitration.

Figure 19:
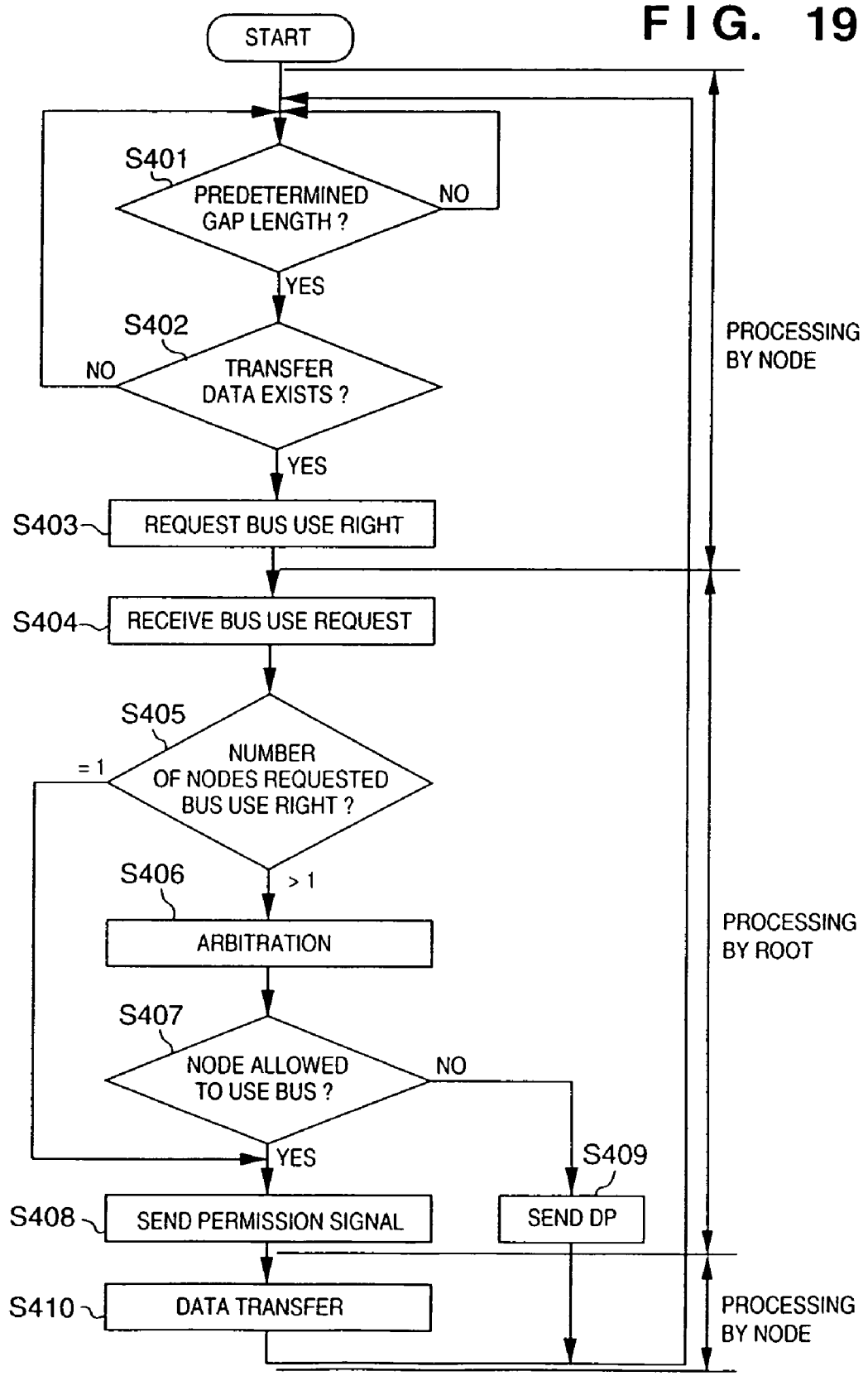
FIG. 19 is a flowchart showing a procedure of the bus arbitration.

Thus, the node that obtained the bus use permission starts data transfer. The sequence of the bus arbitration will be described with reference to the flowchart of FIG. 19.

To start data transfer by a node, the bus must be in idle status. To confirm that data transfer has been completed and the bus is currently in idle status, each node detects a gap length of a predetermined idle period (e.g., sub-action gap) set in each transfer mode, and it determines whether or not the bus is currently in idle status based on the detection result.

in step S401, the node determines whether or not a predetermined gap length corresponding to asynchronous data or isochronous data to be transferred has been detected. So far as the node has not detected the predetermined gap length, it cannot request a bus use right to start data transfer, and accordingly, the node waits until the predetermined gap length has been detected.

When the predetermined gap length has been detected in step S401, the node determines whether or not there is data to be transferred in step S402. If YES, it issues a signal requesting a bus use right to the root in step S403. As shown in FIG. 17, this signal requesting the bus use right is relayed by the respective devices in the network, and forwarded to the root. If it is determined in step S402 that there is no data to be transferred, the process returns to step S401.

In step S404, if the root has received a single or plurality of request signals for the bus use right, it examines the number of nodes requesting the bus use right in step S405. From the determination in step S405, if the number of the nodes requested the bus use right is one, that node is provided with bus use permission immediately after the requirement. On the other hand, if the number of the nodes is more than one, arbitration is performed to determine one node to be provided with the bus use right immediately after the requirement. The arbitration does not always provide a bus use right to the same node, but equally provides a bus use right to the respective nodes (fair arbitration).

The processing at the root branches in step S407 into processing for the node dominated in the arbitration in step S406, and processing for the other nodes lost in the arbitration. In a case where there is one node that requested the bus use right, or one node has dominated in the arbitration, the node is provided with an permission signal indicative of bus use permission in step S408. The node starts data (packet) transfer immediately after it receives the permission signal (step S410). On the other hand, the nodes lost in the arbitration receive a DP (data prefix) packet indicative of rejection of the bus use request in step S409. The processing for the node that received the DP packet returns to step S401 to request a bus use right again. Also, the processing for the node that completed data transfer in step S410 returns to step S401.

[Transaction Layer]

The transaction layer includes a read transaction, a write transaction and a lock transaction.

In a read transaction, an initiator (requiring node) reads data from a specific address in the memory of a target (response node). In a write transaction, the initiator writes data into a specific address of the memory of the target. In a lock transaction, the initiator transfers reference data and update data to the target. The reference data is combined with data of the address of the target, into a designation address to specify a specific address of the target. Data at the designation address is updated by the update data.

Figure 20:
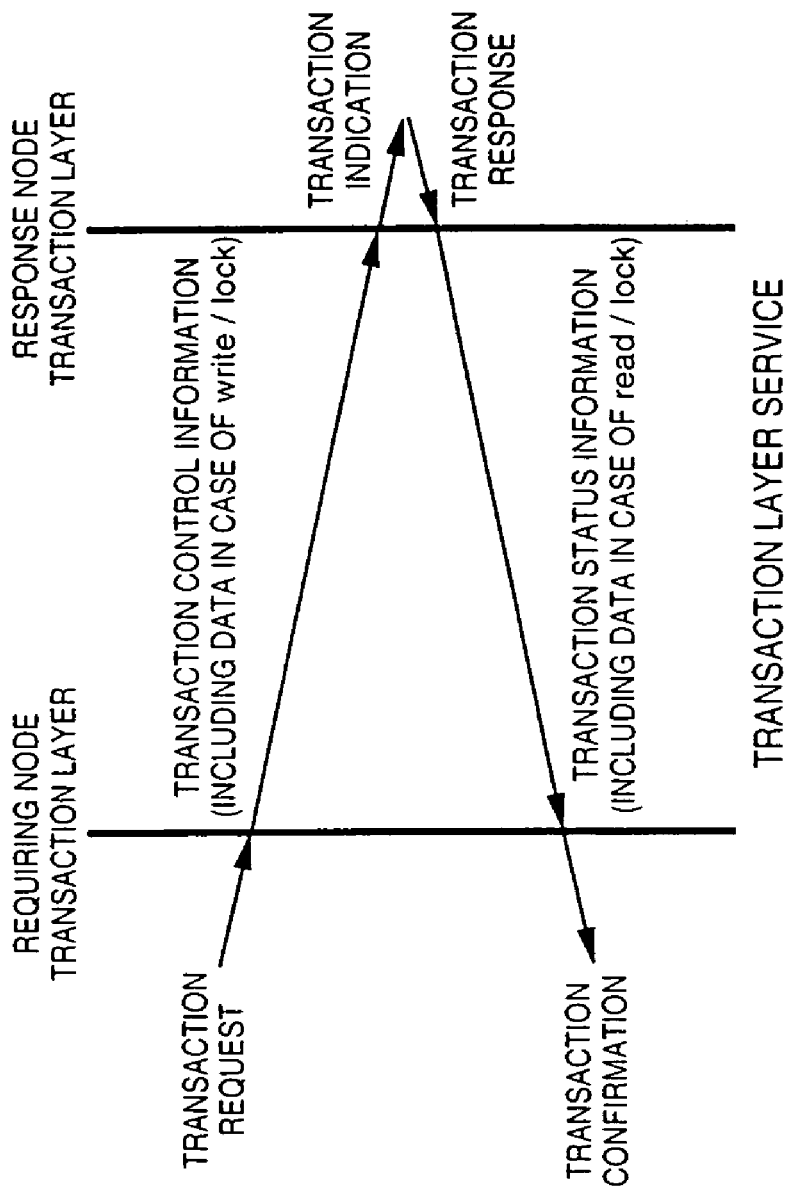
FIG. 20 is a timing chart showing a request-response protocol with read, write and lock commands, based on the CSR architecture in a transaction layer.

FIG. 20 shows a request-response protocol with read, write and lock commands, based on the CSR architecture in the transaction layer. In FIG. 20, the request, notification, response and confirmation are service units in the transaction layer 814.

A transaction request (TR_DATA.request) is packet transfer to a response node; a transaction indication (TR-DATA.indication) is notification of arrival of the request to the response node; a transaction response (TR_DATA.response) is transmission of acknowledgment; and a transaction confirmation (TR_DATA.confirmation) is reception of acknowledgment.

[Link Layer]

Figure 21:
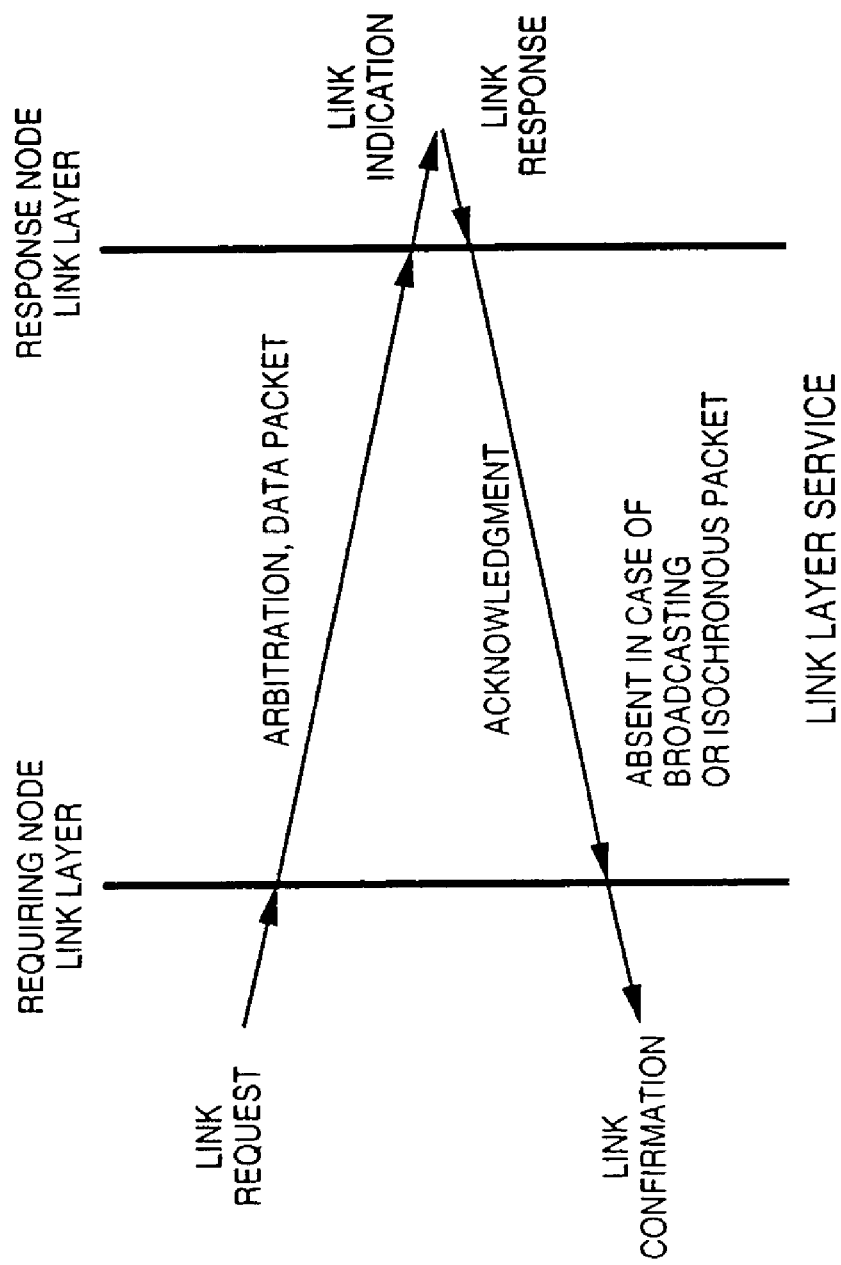
FIG. 21 is a timing chart showing services in a link layer.

FIG. 21 shows services in the link layer 812. The services are service units of a link request (LK_DATA.request) to require packet transfer from the response node, a link indication (LK_DATA.indication) indicating packet reception to the response node, a link response (LK_DATA.response) as acknowledgment transmitted from the response node, a link confirmation (LK_DATA.confirmation) as confirmation of the acknowledgment transmitted from the response node.

One packet transfer process is called a sub-action including an asynchronous sub-action and an isochronous sub-action. Hereinbelow, the respective operations of the sub-actions will be described.

[Asynchronous Sub-Action]

Figure 22:
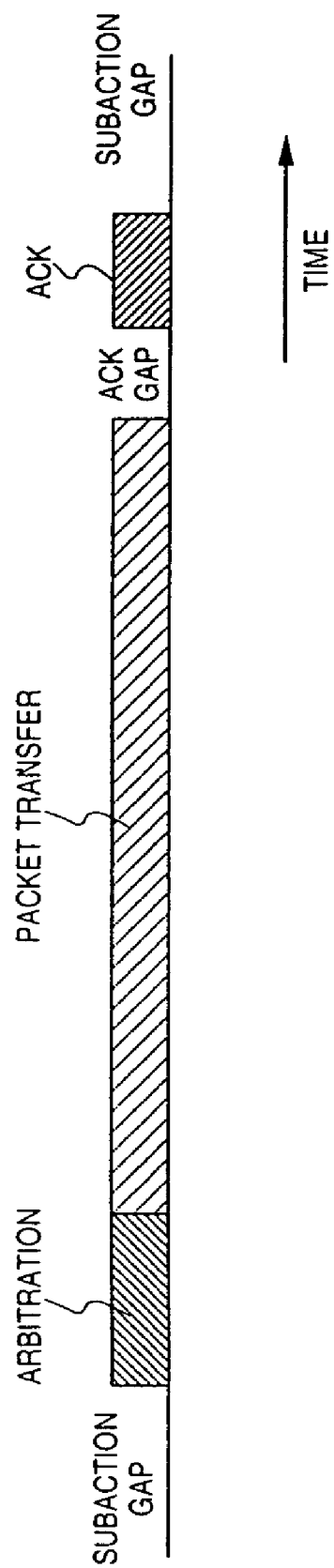
FIG. 22 is a timing chart showing transitional statuses in asynchronous data transfer.

The asynchronous sub-action is asynchronous data transfer. FIG. 22 shows transition in the asynchronous transfer. In FIG. 22, the first sub-action gap represents the idle status of the bus. At a point where the idle time has become a predetermined value, a node which is to perform data transfer requests a bus use right, then bus arbitration is executed.

When the use of bus has been allowed by the arbitration, data in the form of packet is transferred, and a node which receives the data sends a reception acknowledgment code ACK as a response, or sends a response packet after a short gap called ACK gap, thus the data transfer is completed. The code ACK comprises 4-bit information and a 4-bit checksum. The code ACK, including information indicative of success, busy or pending status, is immediately sent to the data-sender node.

Figure 23:
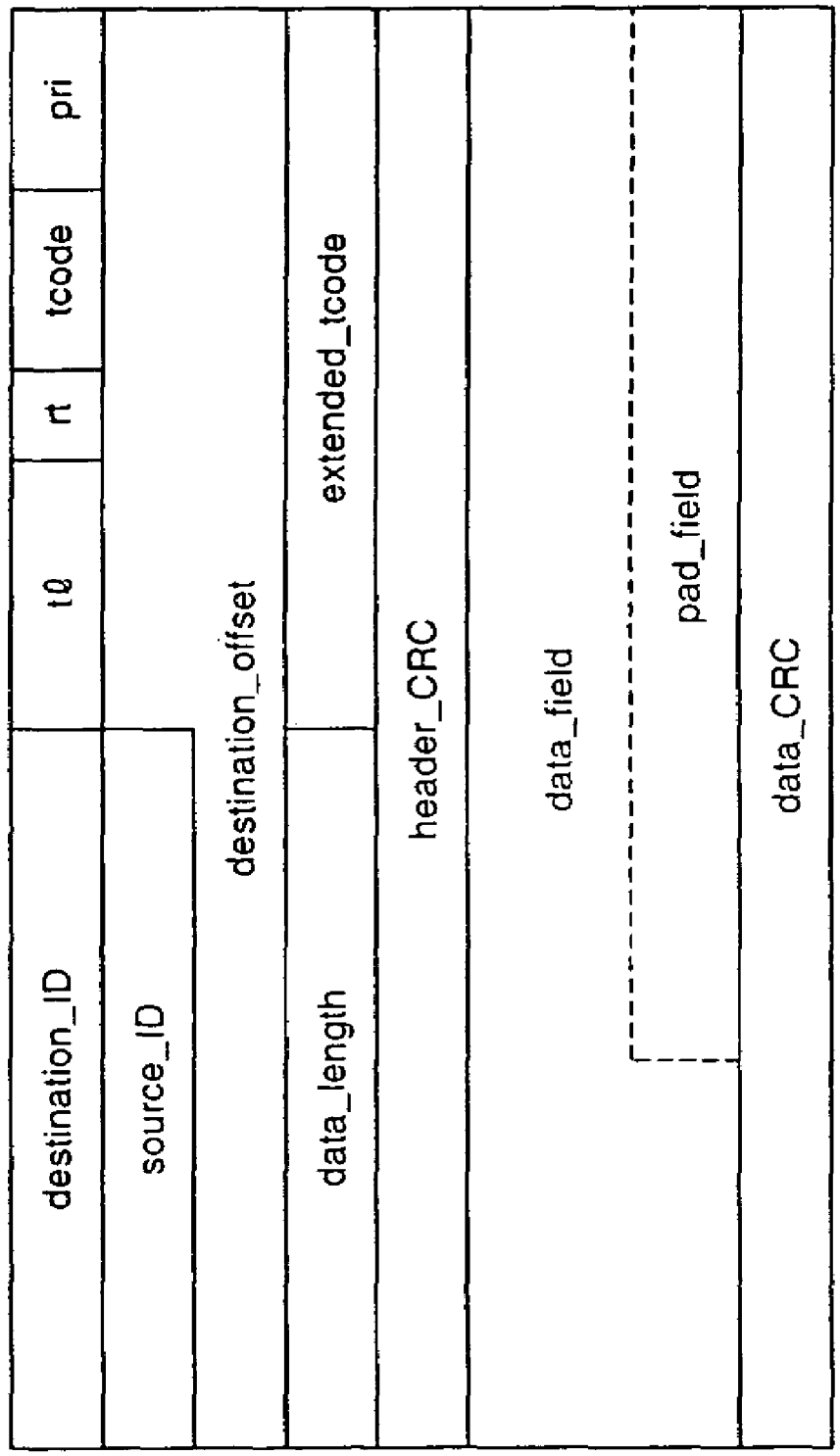
FIG. 23 is a diagram showing a packet format for the asynchronous transfer.

FIG. 23 shows a packet format for asynchronous transfer. The packet has a data area, a data CRC area for error correction, and a header area in which a destination node ID, a source node ID, a transfer data length and various codes are written.

The asynchronous transfer is one-to-one communication from a sender node to a receiver node. A packet sent from the sender node is relayed by the respective nodes in the network, however, as these nodes are not designated as the receiver of the packet, they ignore the packet, then only the receiver node designated by the sender node receives the packet.

[Isochronous Sub-Action]

Isochronous transfer, which can be regarded as the greatest feature of the 1394 serial bus is appropriate to multimedia data transfer which requires realtime transfer of, especially, AV data. Further, the asynchronous transfer is one-to-one transfer, whereas the isochronous transfer is broadcasting transfer from one sender node to all the other nodes.

Figure 24:
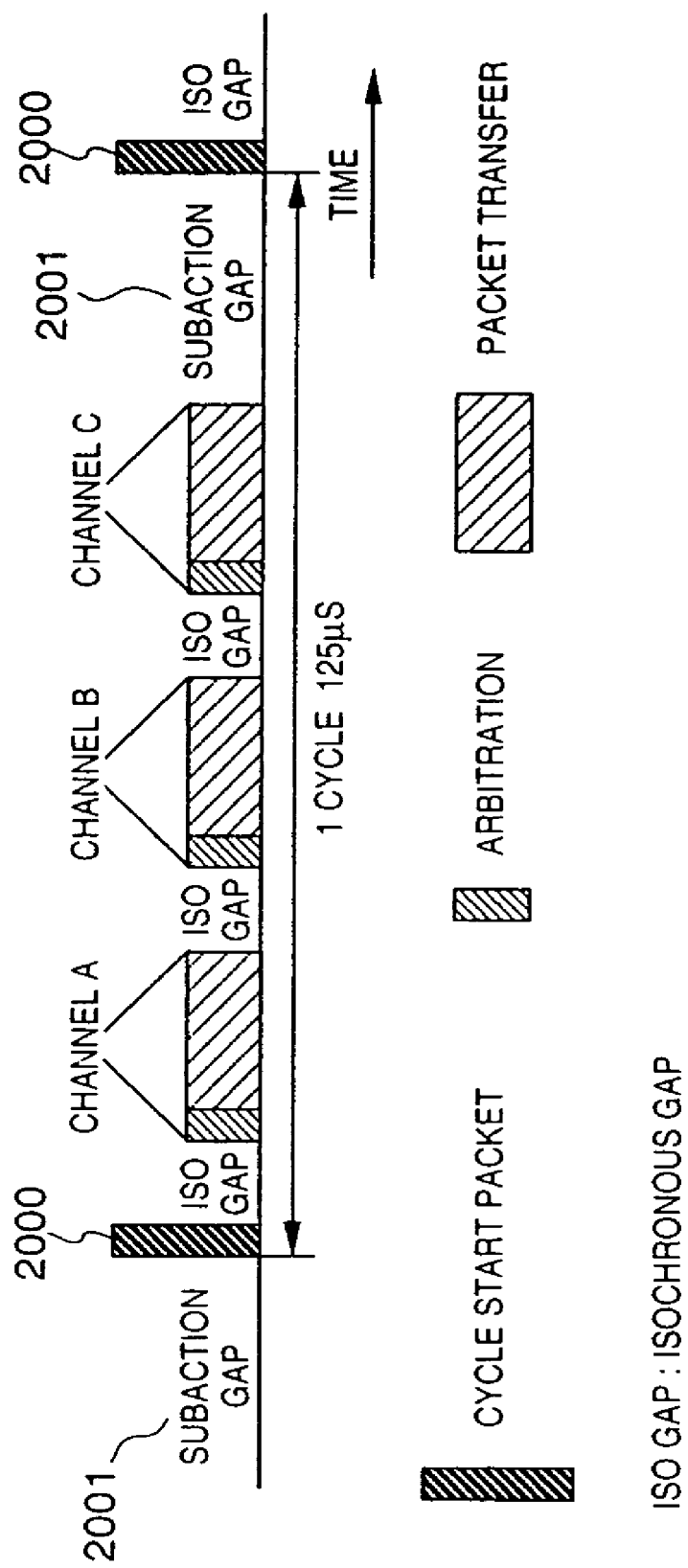
FIG. 24 is a timing chart showing transitional statuses in isochronous data transfer.

FIG. 24 shows transition in the isochronous transfer. The isochronous transfer is executed on the bus in a predetermined cycle, called "isochronous cycle". The period of the isochronous cycle is 125 µs. A cycle start packet (CSP) 2000 indicates the start of the isochronous cycle for asynchronizing the operations of the respective nodes. When data transfer in a cycle has been completed and a predetermined idle period (sub-action gap 2001) has elapsed, a node which is called "cycle master" sends the CSP 2000 indicative of the start of the next cycle. That is, this interval between the issuance of CSP's is 125 µs.

As channel A, channel B and channel C in FIG. 24, the respective packets are provided with a channel ID, so that plural types of packets can be independently transferred within one isochronous cycle. This enables substantially realtime transfer among the plural nodes. The receiver node can receive only data with a predetermined channel ID. The channel ID does not indicate an address of the receiving node, but merely indicates a logical number with respect to the data. Accordingly, one packet sent from a sender node is transferred to all the other nodes, i.e., broadcasted.

Similar to the asynchronous transfer, bus arbitration is performed prior to the packet broadcasting in isochronous transfer. However, as the isochronous transfer is not one-to-one communication like the asynchronous transfer, the reception acknowledgment code ACK used as a response in the asynchronous transfer is not used in the isochronous transfer.

Further, an isochronous gap ("iso gap") in FIG. 24 represents an idle period necessary for confirming prior to isochronous transfer that the bus is in idle status. If the predetermined idle period has elapsed, bus arbitration is performed with respect to node(s) desiring isochronous transfer.

Figure 25:
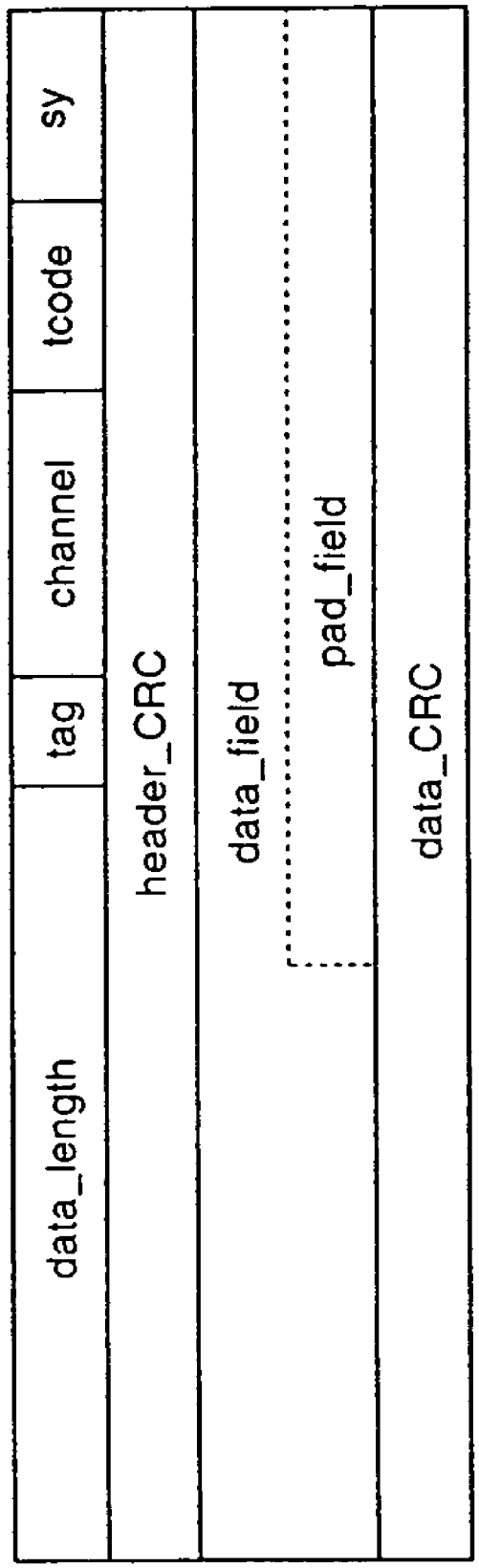
FIG. 25 is an example of a packet format for the isochronous transfer.

FIG. 25 shows a packet format for isochronous transfer. Various packets divided into channels respectively have a data field, a data CRC field for error correction and a header field containing information such as a transfer-data length, a channel number, various codes and error-correction header CRC as shown in FIG. 26.

[Bus Cycle]

Figure 27:
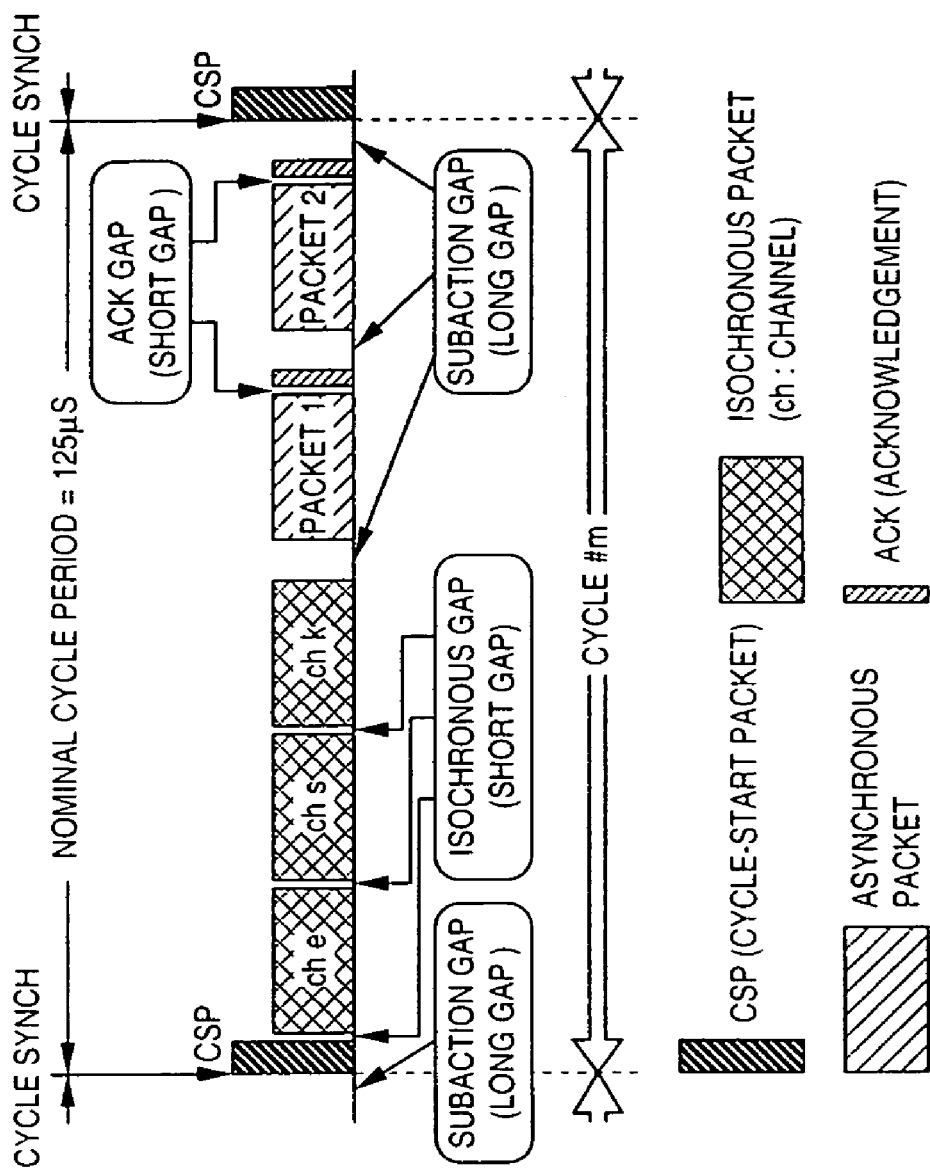
FIG. 27 is a timing chart showing transitional statuses in data transfer on the bus when the isochronous transfer and asynchronous transfer are mixedly performed.

In practice, both isochronous transfer and asynchronous transfer can be mixedly performed on the 1394 serial bus. FIG. 27 shows transition in the isochronous transfer and asynchronous transfer mixedly performed on the 1394 serial bus.

The isochronous transfer is performed prior to the asynchronous transfer because after the CSP, the isochronous transfer can be started with a gap (isochronous gap) shorter than the idle period necessary for starting the asynchronous transfer. Accordingly, the isochronous transfer has priority over the asynchronous transfer.

In the typical bus cycle as shown in FIG. 27, upon starting the cycle #m, a CSP is transferred from the cycle master to the respective nodes. The operations of the respective nodes are asynchronized by this CSP, and node(s) that waits for a predetermined idle period (isochronous gap) to perform isochronous transfer participates in bus arbitration, then starts packet transfer. In FIG. 27, a channel e, a channel s and a channel k are transferred by the isochronous transfer.

The operation from the bus arbitration to the packet transfer is repeated for the given channels, and when the isochronous transfer in the cycle #m has been completed, the asynchronous transfer can be performed. That is, when the idle period has reached the sub-action gap for the asynchronous transfer, node(s) that is to perform the asynchronous transfer participates in bus arbitration. Note that only if the sub-action gap for starting the asynchronous transfer is detected, after the completion of isochronous transfer and before the next timing to transfer the CSP (cycle synch), the asynchronous transfer can be performed.

In the cycle #m in FIG. 27, the isochronous transfer for three channels is performed, and then two packets (packet 1 and packet 2) including ACK are transferred by the asynchronous transfer. When the asynchronous packet 2 has been transferred, as the next cycle synch point to start the subsequent cycle m+1 comes, the transfer in the cycle #m ends. Note that during the asynchronous or isochronous transfer, if the next cycle synch point to transfer the next CSP has come, the transfer is not forcibly stopped but continued. After the transfer has been completed, a CSP for the next cycle is transferred after a predetermined idle period. That is, when one isochronous cycle is continued for more than 125 µs, the next isochronous cycle is shorter than the reference period 125 µs. In this manner, the isochronous cycle can be lengthened or shortened based on the reference period 125 µs.

However, it may be arranged such that the isochronous transfer is performed in every cycle, while the asynchronous transfer is sometimes postponed until the next cycle or the cycle further subsequent to the next cycle, so as to maintain realtime transfer. The cycle master also manages information on such delay.

The IEEE 1394 serial bus used in this embodiment has been described. Characteristic control in the first embodiment will be explained.

[Arbitration Method/Distribution Control of Image Processing]

The system arrangement shown in FIG. 1 can realize higher-speed data communication by connecting the digital camera 1 and printer 2 in one-to-one correspondence using a 1394 serial bus having the above-described arrangement and functions. In the first embodiment, data is asynchronously transferred between the digital camera 1 and the printer 2. In this system, the digital camera 1 has higher performance than the printer 2, so that the first embodiment can distribute image processing which should be generally performed by the printer 2 to the digital camera 1.

In the system of the first embodiment, the digital camera 1 and printer 2 can equally execute distribution control of image processing using the peer-to-peer feature of the 1394 serial bus, and either apparatus can take the initiative of this control.

In the first embodiment, an apparatus having the node ID=0 can take the initiative based on the node ID of each apparatus set by bus reset in connection. The first embodiment will exemplify a case wherein the digital camera 1 attains the node ID=0 to take the initiative of distribution control, and controls distribution of image processing which should be performed by the printer 2.

The outline of the sequence of printing processing in the first embodiment will be described.

In the image processing system of this embodiment, image data sensed by the image input unit 8 of the digital camera 1 is subjected to image processing such as color correction and data compression by the image processing unit 9 if necessary, and then stored in the RAM 7. The compressed data is input to the I/F 3, which transfers the data to the printer 2 via the 1394 serial bus.

The printer 2 which has received the compressed data via the I/F 4 sends the compressed data to the data processing unit 13 where the data is decompressed. After the decompressed data undergoes image data correction, color correction and the like if necessary, the data is subjected to RGB-CMYK conversion, halftoning and native command processing, and transmitted to the printer driving unit 15. Then, image forming processing on a printing sheet, i.e., printing operation starts.

Figure 28:
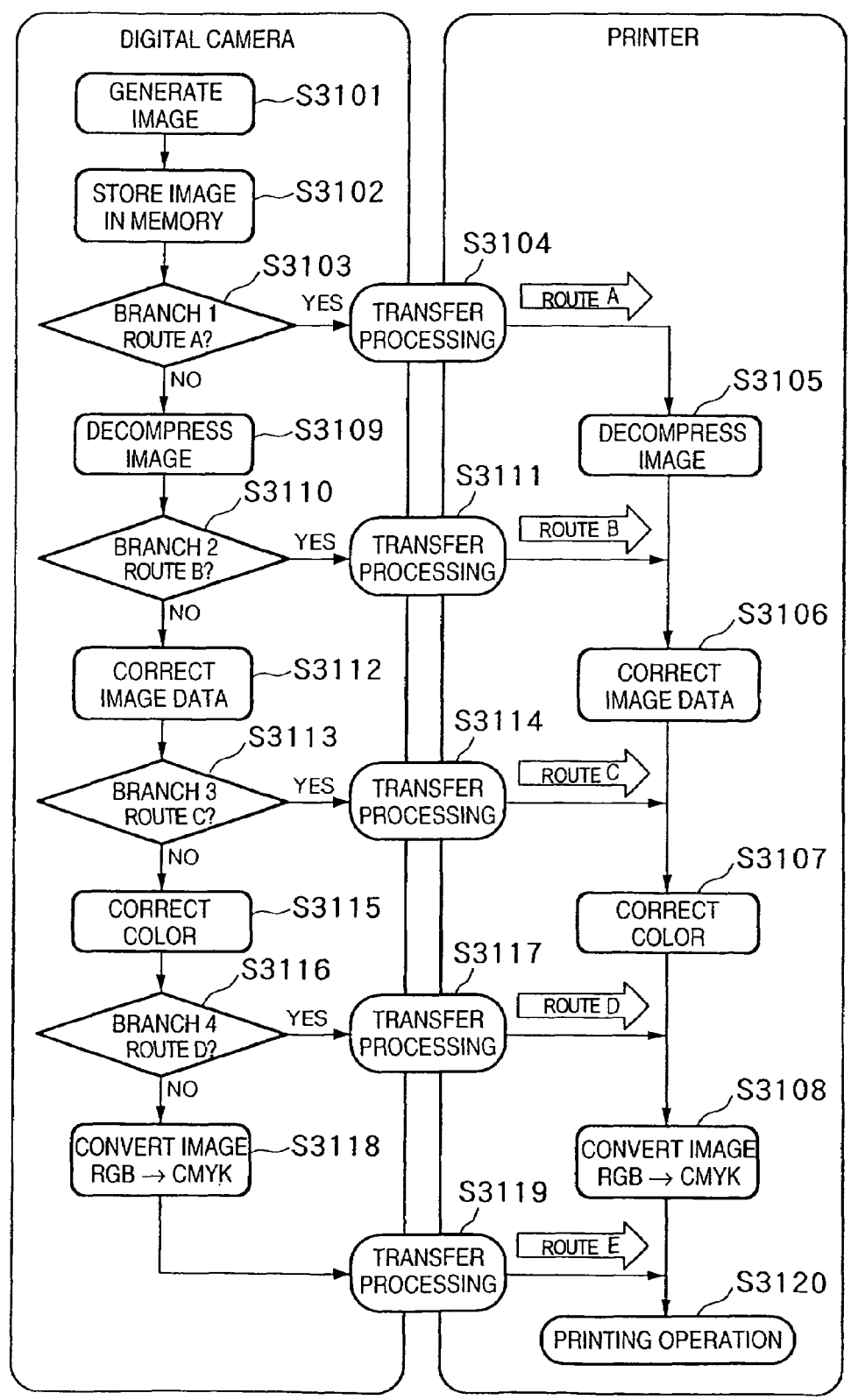
FIG. 28 is a flowchart showing details of the sequence of printing processing in the first embodiment.

FIG. 28 is a flowchart showing details of the sequence of printing processing in the first embodiment. The left side of FIG. 28 shows processing in the digital camera 1, and the right side shows processing in the printer 2. The first embodiment can execute five roots A to E (to be described later) as processing sequences.

The digital camera 1 performs image generation processing in step S3101 in order to input a sensed image, compresses the generated image data in step S3102, and then stores it in a memory such as the RAM 7.

Process of Route A

The process of route A as the most general route will be explained. In executing the process of route A, the process branches in step S3103 to the route A side to read out image data from the memory in step S3104 and transfer the image data to the printer 2.

In step S3105, the printer 2 decompresses the image data transferred via route A. In general, image data generated by a digital camera or the like is processed as a compressed file which is advantageous in the memory use capacity and transfer time. Hence, the compressed file must be decompressed by the printer 2 in step S3105. When uncompressed image data is received, the data need not be decompressed.

The image data undergoes in step S3106 image data correction of, e.g., changing the image size if necessary, and undergoes color correction in step S3107 if necessary. In step S3108, the obtained image data undergoes image conversion processing of converting the image data from an RGB format as the input format of the digital camera 1 into a CMYK format suitable for image formation by the printer 2. In step S3120, actual printing operation is executed based on the image data of the CMYK format.

Process of Route B

Route B as a processing sequence different from route A will be described. In executing the process of route B, the process in the digital camera 1 branches in step S3103 not to route A but to step S3109, and compressed image data is read out from the memory and decompressed. After that, the process branches in step S3110 to route B to transfer the decompressed image data to the printer 2 in step S3111. The printer 2 performs the above-described correction processing, in step S3106, on the transferred image data. The subsequent process is the same as route A.

Process of Route C

In executing the process of route C, the process in the digital camera 1 branches in step S3110 not to route B but to step S3112, and necessary image data correction is performed. Then, the process branches in step S3113 to route C to transfer the corrected image data to the printer 2 in step S3114. The printer 2 performs the above-described color correction processing in step S3107, on the transferred image data. The subsequent process is the same as route A.

Process of Route D

In executing the process of route D, the process in the digital camera 1 branches in step S3113 not to route C but to step S3115, and necessary color correction is performed. The process branches in step S3116 to route D to transfer the color-corrected image data to the printer 2 in step S3117. The printer 2 performs the above-described image conversion processing in step S3108, on the transferred image data. The subsequent process is the same as route A.

Process of Route E

In executing the process of route E, the process in the digital camera 1 branches in step S3116 not to route D but to step S3118, and image conversion from the RGB format to the CMYK format is performed. In step S3119, the converted image data is transferred to the printer 2. The printer 2 executes the above-described printing operation in step S3112 on the basis of the transferred image data.

routes B to E shown in FIG. 28 execute transfer processing (S3111, S3114, S3117, and S3119) after decompression processing in step S3109, so that the data amount to be transferred increases in comparison with transfer processing (S3104) of route A. The transfer time is, therefore, the shortest in route A.

As shown in the flowchart of FIG. 28, image processing in the first embodiment selectively executes any one of Routes A to E. A route selection method in the first embodiment will be described in detail.

Process of Route Selection

Figure 29:
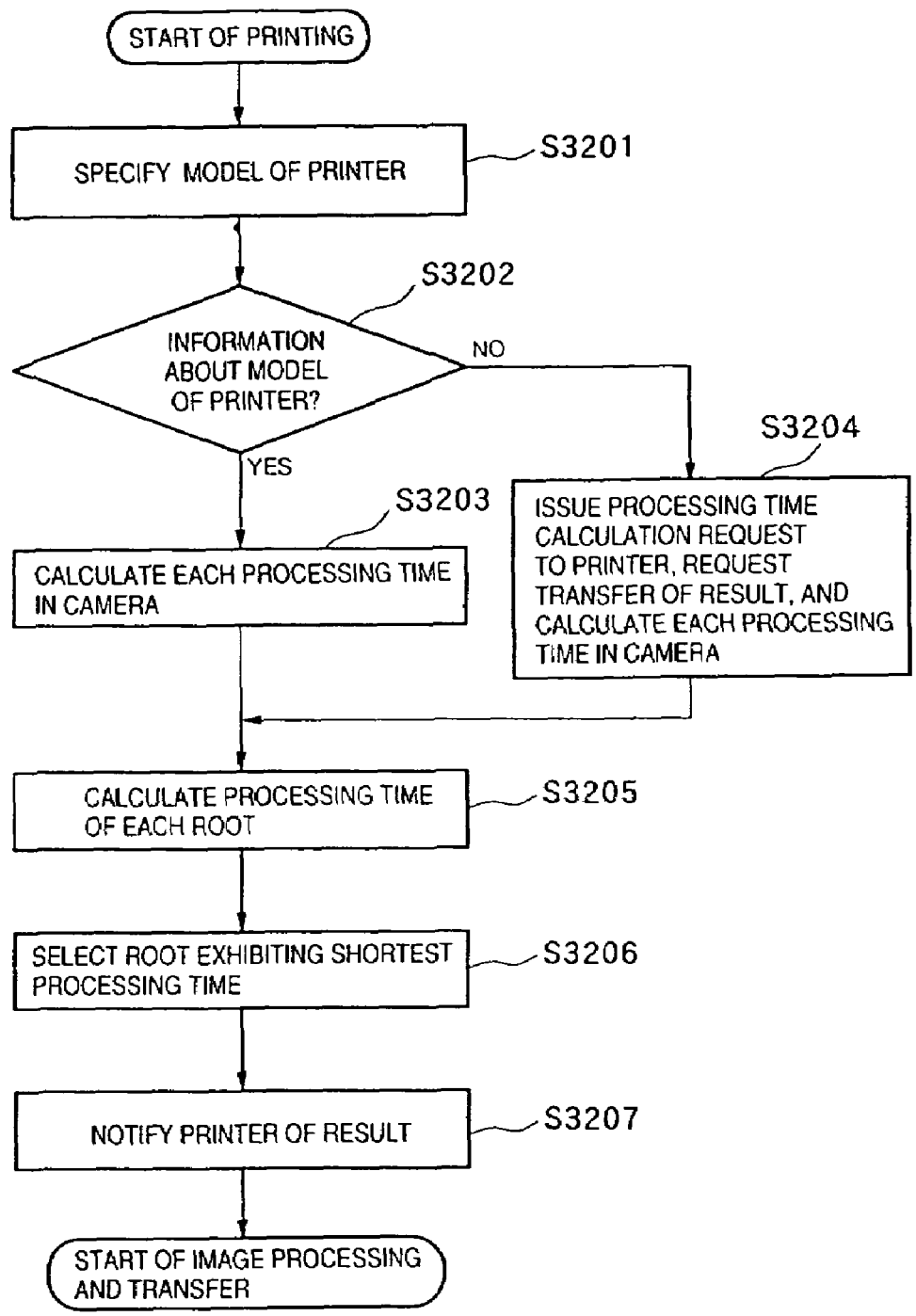
FIG. 29 is a flowchart showing root selection processing in the first embodiment.

FIG. 29 is a flowchart showing route selection processing in the first embodiment. This selection processing is executed under the control of the CPU 5 in the digital camera 1 which has taken the initiative by the above arbitration.

After printing processing starts, the digital camera 1 reads the configuration ROM of the printer 2 in step S3201, and specifies the model of printer based on the contents. Note that the configuration ROM has already been read in connecting the apparatus, and if its contents are stored in a memory or the like, the stored contents are read out.

In step S3202, whether the digital camera 1 holds information about the model of printer specified in step S3201 is checked. If YES in step S3202, the process branches to S3203; and if NO, to step S3204.

If NO in step S3202, the digital camera 1 issues a processing time calculation request to the printer 2 in step S3204. This request is asynchronously transferred on the 1394 serial bus. After the digital camera 1 requests the response of the results and receives the calculation results, the digital camera 1 calculates the processing time of each processing. Then, the process proceeds to step S3205. The printer 2 which has received the processing time calculation request calculates the processing time of each processing in the printer 2 described with reference to FIG. 28 in accordance with an image to be printed. Upon the completion of calculation, the printer 2 returns each processing time to the digital camera 1.

If YES in step S3202, the digital camera 1 calculates in step S3203 the processing time of each processing in the digital camera 1 described with reference to FIG. 28 in accordance with an image to be printed. Then, the process proceeds to step S3205.

In step S3205, the digital camera 1 calculates the total processing time of each of routes A to E shown in FIG. 28. The digital camera 1 selects a route exhibiting the shortest total processing time in step S3206, and notifies the printer 2 of the selection result in step S3207 to cause the printer 2 to prepare for printing.

Image processing and transfer processing shown in FIG. 28 start by the selected route exhibiting the shortest total processing time.

Calculation of the total processing time of each route in step S3205 is done as follows. When each processing shown in FIG. 28 is to be performed in units of blocks of image data, given processing ends for all the data in one block, and then the block is subjected to the next processing. Based on this assumption, the total processing time can be calculated by simple addition. route selection in this case greatly depends on the performance of a CPU or the like and the transfer processing speed in each apparatus.

In practice, however, each processing is often executed in units of small blocks prepared by dividing one block of image data. When a given processing is executed on one block of image data, the processing results are sequentially transmitted to the next processing in units of small blocks having undergone the processing. This realizes immediate processing in units of small blocks depending on the contents of the next processing, and two processes are parallel-performed to shorten the processing time. Hence, actual route selection requires not simple addition but complicated calculation.

For example, route C shown in FIG. 28 allows parallel-executing image data correction processing in step S3112 and transfer processing in step S3114. The total processing time of route C is calculated by subtracting the parallel processing time from the total of times required for these processes. In other words, the total processing time is shorter than the simple sum of processing times by the parallel processing time.

Another route also allows parallel-executing color correction processing in step S3115 and transfer processing in step S3117, or image conversion in step S3118 and transfer processing in step S3119. This parallel processing shortens the total processing time. Thus, for another route, the total processing time is calculated in step S3205 shown in FIG. 29 in consideration of the parallel processing time.

Since the total processing time is calculated in this way, the performance of each apparatus influences route selection as follows:

① When the performance of the digital camera 1 is low, route A is advantageous.

② When the transfer performance is low, route A is advantageous.

③ When the performance of the digital camera 1 is high, and that of the printer 2 is extremely low, route E is advantageous.

④ When the digital camera 1 and printer 2 are equal in performance, route selection is greatly influenced by other conditions (e.g., image size).

In the first embodiment, the transfer performance is high because the 1394 serial bus is used for communication between the apparatuses. Therefore, condition ②, "the transfer performance is low", is excluded. Furthermore, the first embodiment assumes that the digital camera 1 has relatively high performance, so condition ① is also excluded. As a result, ③ or ④ is selected. That is, a route other than route A is selected with high possibility. Distribution of image processing to the digital camera 1 exhibiting relatively high performance increases, and concentration of the load on the printer 2 can be avoided.

As described above, according to the first embodiment, in the image processing system which can transfer image data at high speed by directly connecting the digital camera and printer via the 1394 serial bus, the digital camera exhibiting relatively high performance is selected by arbitration based on the node ID, and takes the initiative of distribution control of image processing. The digital camera executes control of optimally distributing, to the digital camera, image processing which is generally performed by the printer. This can shorten the total time required for image printing processing in the system.

Second Embodiment

The second embodiment according to the present invention will be described below.

An image processing system in the second embodiment has the same arrangement as that in the first embodiment, data is asynchronously transferred between a digital camera 1 and a printer 2, and a detailed description thereof will be omitted. The system of the second embodiment is different from that of the first embodiment in that the printer 2 has higher performance than the digital camera 1. The second embodiment can increase distribution of image processing to the printer 2.

In the second embodiment, similar to the first embodiment, the digital camera 1 and printer 2 can equally execute distribution control of image processing using the peer-to-peer feature of the 1394 serial bus, and either apparatus can take the initiative of this control.

In the second embodiment, when the peer-to-peer connection partner of the digital camera 1 is the printer 2 exhibiting relatively high performance, distribution control is done on the initiative of the printer 2 in order to distribute image processing in accordance with the status of the printer 2.

The image processing system of the second embodiment can also execute five routes A to E shown in FIG. 28 in the first embodiment, and executes image processing by selecting any one of the routes. A route selection method in the second embodiment will be explained in detail.

Figure 30:
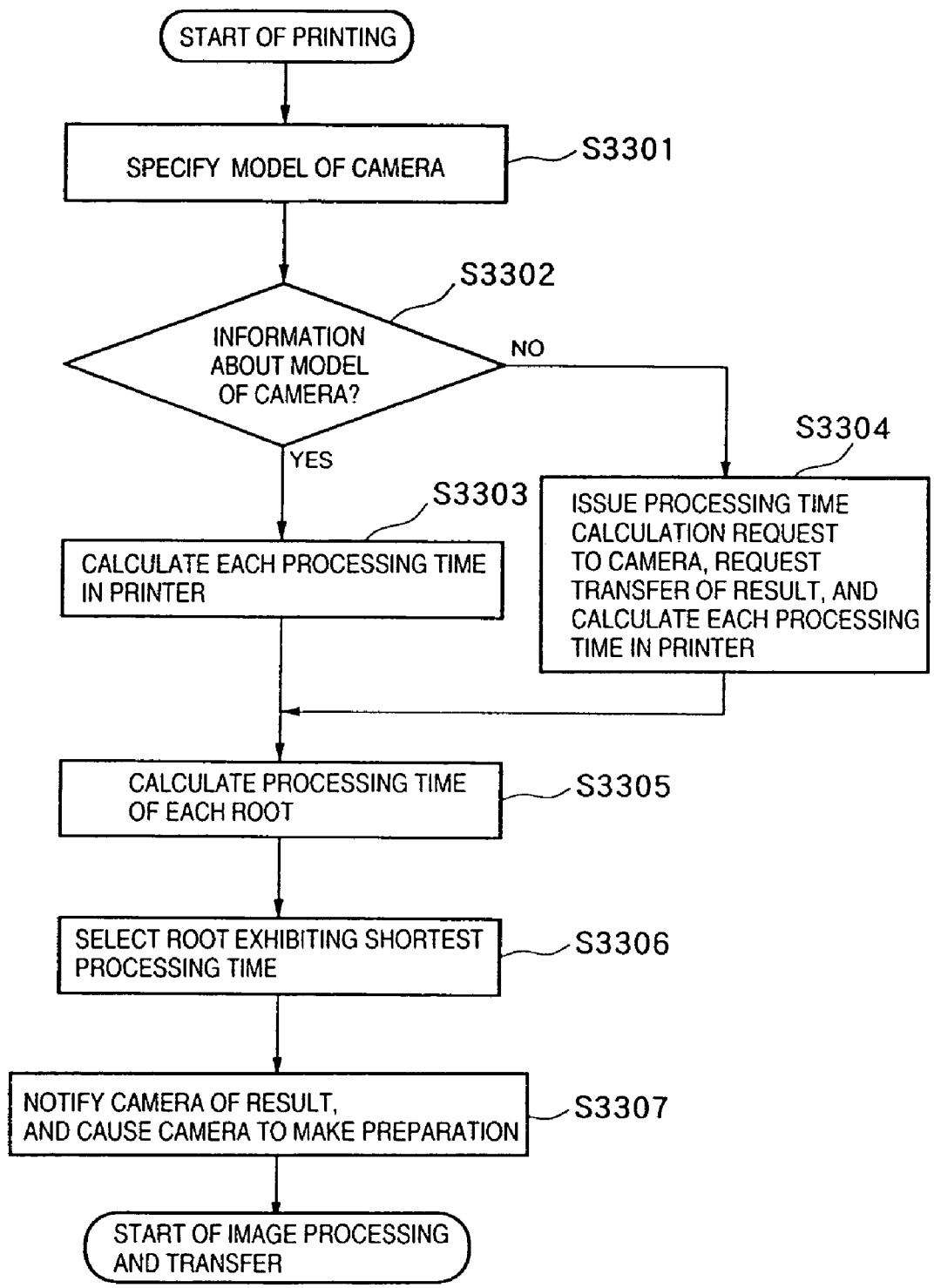
FIG. 30 is a flowchart showing root selection processing in the second embodiment.

FIG. 30 is a flowchart showing route selection processing in the second embodiment. An apparatus constituting the image processing system of the second embodiment ("first apparatus" or "self apparatus") can determine the type of partner apparatus by reading information of the configuration ROM of the partner apparatus by bus reset processing in system ON operation or system connection. If the partner apparatus is a "printer", the first apparatus starts subordinate processing; and if the first apparatus is a "printer", it takes the initiative of distribution control of image processing in the system, and executes the above-mentioned route selection processing under the control of a CPU 10. After printing processing starts, the printer 2 read-accesses the configuration ROM of the digital camera 1, and specifies the model of digital camera based on the read contents. Note that the configuration ROM has already been read in connecting the apparatus, and if its contents are stored in a memory or the like, the stored contents are read out.

In step S3302, whether the printer 2 has information about the model of digital camera specified in step S3301 is checked. If YES in step S3302, the process branches to S3303; and if NO, to step S3304.

If NO in step S3302, the printer 2 issues a processing time calculation request to the digital camera 1. This request is asynchronously transferred on the 1394 serial bus. After the printer 2 requests the response of the results and receives the calculation results, the printer 2 calculates its processing time. Then, the process proceeds to step S3305. The digital camera 1 which has received the processing time calculation request calculates the processing time in the digital camera 1 for each route described with reference to FIG. 28 in accordance with an image to be printed. Upon the completion of calculation, the digital camera 1 returns the processing time of each route to the printer 2.

If YES in step S3302, the printer 2 calculates in step S3303 the processing time of each route in the printer 2 described with reference to FIG. 28 in accordance with an image to be printed. Then, the process proceeds to step S3305.

In step S3305, the printer 2 calculates the total processing time of each of routes A to E shown in FIG. 28. The printer 2 selects a route exhibiting the shortest total processing time in step S3306, and notifies the digital camera 1 of the selection result in step S3307 to cause the digital camera 1 to prepare for printing.

Image processing and transfer processing shown in FIG. 28 start by the route which is selected in this manner and exhibits the shortest processing time.

The total processing time of each route in step S3305 in the second embodiment must be calculated in consideration of the parallel processing time, similar to the first embodiment. Also in the second embodiment, the performance of each apparatus influences route selection, like ① to ④.

In the second embodiment, the transfer performance is high because the 1394 serial bus is used for communication between apparatuses, and condition ②, "the transfer performance is low", is excluded. In addition, the second embodiment assumes that the printer 2 has relatively high performance, and thus ③ "the performance of the printer 2 is extremely low" is also excluded. As a result, ① "the performance of the digital camera 1 is low" or ④ "the digital camera 1 and printer 2 are equal in performance" is selected. Route A is selected with high possibility, and distribution of image processing to the printer 2 exhibiting relatively high performance increases.

As described above, according to the second embodiment, in the image processing system which can transfer image data at high speed by directly connecting the digital camera and printer via the 1394 serial bus, the printer exhibiting relatively high performance optimally distributes image processing between apparatuses. This can shorten the total time required for image printing processing in the system.

Modification of Second Embodiment

In the second embodiment, the printer 2 takes the initiative of distribution control of processing to simply increase distribution in the printer 2. Processing distribution can be more efficiently done in accordance with the processing status of the printer 2.

In the flowchart shown in FIG. 28, route A is selected with high possibility. However, the second embodiment performs high-speed transfer using the 1394 serial bus, and data transfer processing ends instantaneously. For example, when the transfer speed is 400 Mbps, and image data is 100-Mbit data, the transfer time is about 0.25 sec by simple calculation though the transfer speed slightly changes because another processing is actually executed. Even after the end of data transfer, the printer 2 spends a given time until printing processing of the transferred data ends. This modification effectively uses this idle time till the end of printing.

In this modification, the digital camera 1 executes image processing for the same image data as the transferred data in parallel with printing processing in the printer 2 after the end of data transfer. The digital camera 1 transfers the processed image data to the printer 2 again in order to store the data in a RAM 205 set in the private memory space of the 1394 bus at the node of the printer 2. One of identical bodies of data subjected to image processing by both the printer 2 and digital camera 1 is used for printing processing, and the other is stored in the private memory of the printer 2.

More specifically, after the end of data transfer, the digital camera 1 appropriately performs image processing (except for transfer processing) from step S3109 to S3118 shown in FIG. 28 for the same image date as the transferred data. The digital camera 1 transfers the processed image data to the printer 2 by any one of routes B to E, and stores it in the private memory space in the printer 2. Note that a route used to transfer processed data in the digital camera 1, i.e., image processing to be performed is controlled based on the status of the printer 2.

Figure 31:
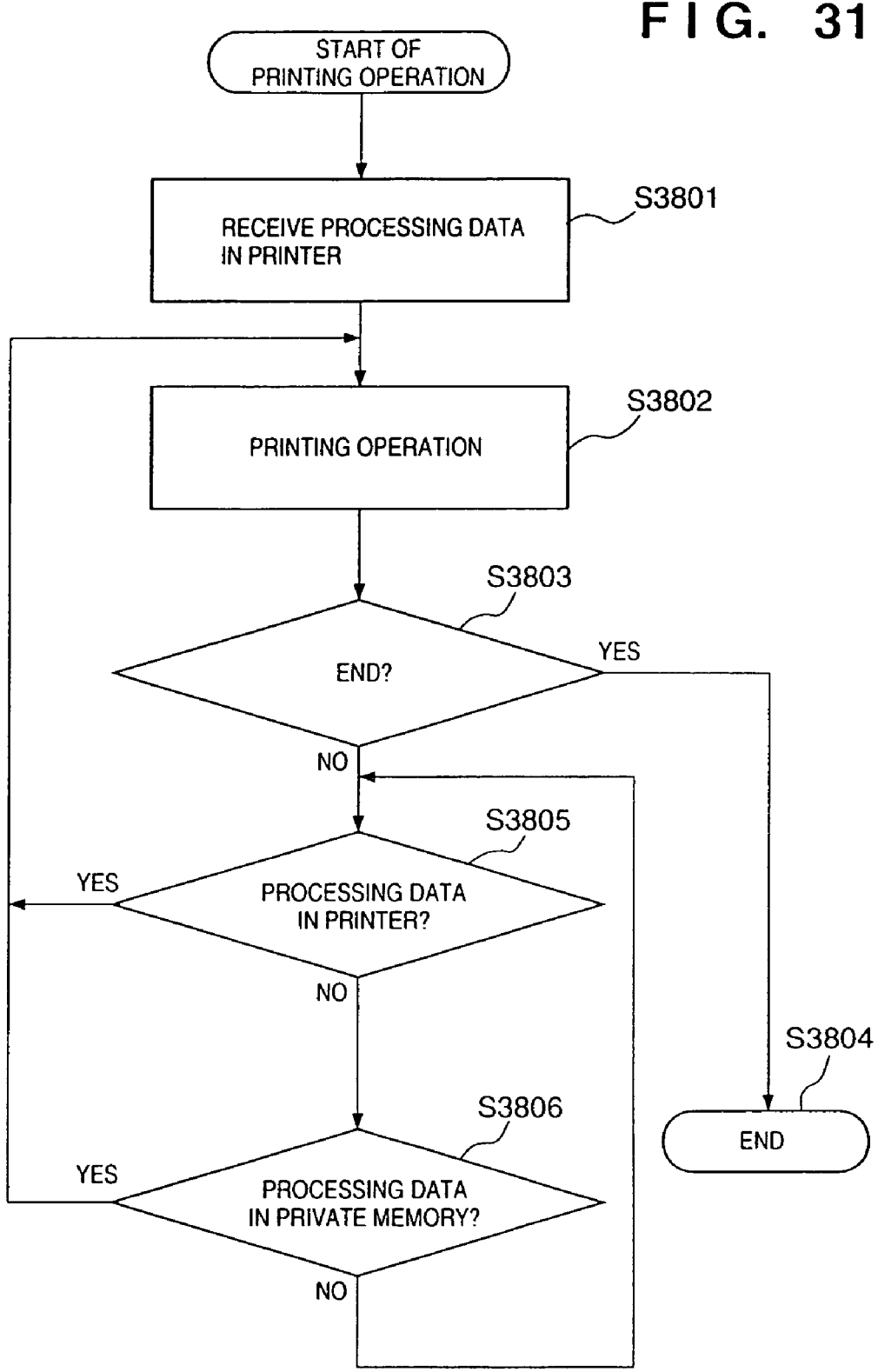
FIG. 31 is a flowchart showing selection control processing for image processing data in a modification of the second embodiment.

FIG. 31 is a flowchart showing processing after the start of printing operation in the printer 2. This processing is controlled by the CPU 10 of the printer 2.

After printing operation starts, image data processed by the printer 2 is read out from a RAM 12 or the internal image memory (not shown) of a data processing unit 13 in step S3801, and a printer driving unit 15 executes printing operation in step S3802. Whether all the printing operations end is checked in step S3803, and if Y in step S3803, printing processing ends in step S3804.

If NO in step S3803, the process proceeds to step S3805 to check whether the image data processed by the printer 2 is stored in the image memory. If YES in step S3805, the process returns to step S3802 to continue printing operation. If NO in step S3805, the process advances to step S3806 to check whether the processed image data is stored in the private memory (RAM 205) mounted in the printer 2. If YES in step S3806, the image data is printed in step S3802. If NO in step S3806, the process returns to step S3805 to wait for data to be printed.

Note that image data processed by the digital camera 1 is stored in the private memory of the printer 2, but may be stored in the private memory of the digital camera 1. Also in this case, the image data can be read out by the printer 2 via the 1394 serial bus, and the same control as in the flowchart of FIG. 31 can be executed.

As described above, according to the modification of the second embodiment, both the digital camera and printer perform image processing for the same data, and the data processed by the digital camera is stored in a memory set in the 1394 serial bus space. Consequently, the printer exhibiting relatively high performance can properly select either of image processing results of the digital camera and printer as image data to be printed.

The total time required for image printing processing can be shortened in the image processing system which can transfer image data at high speed by directly connecting the digital camera and printer via the 1394 serial bus.

Third Embodiment

The third embodiment according to the present invention will be described below.

An image processing system in the third embodiment has the same arrangement as that in the first embodiment, data is asynchronously transferred between a digital camera 1 and a printer 2, and a detailed description thereof will be omitted.

Optimal distribution of image processing between apparatuses constituting the system is controlled by the digital camera 1 in the first embodiment, and by the printer 2 in the second embodiment. The third embodiment concerns a method of determining which of the apparatuses controls optimal distribution of image processing between the apparatuses.

Figure 32:
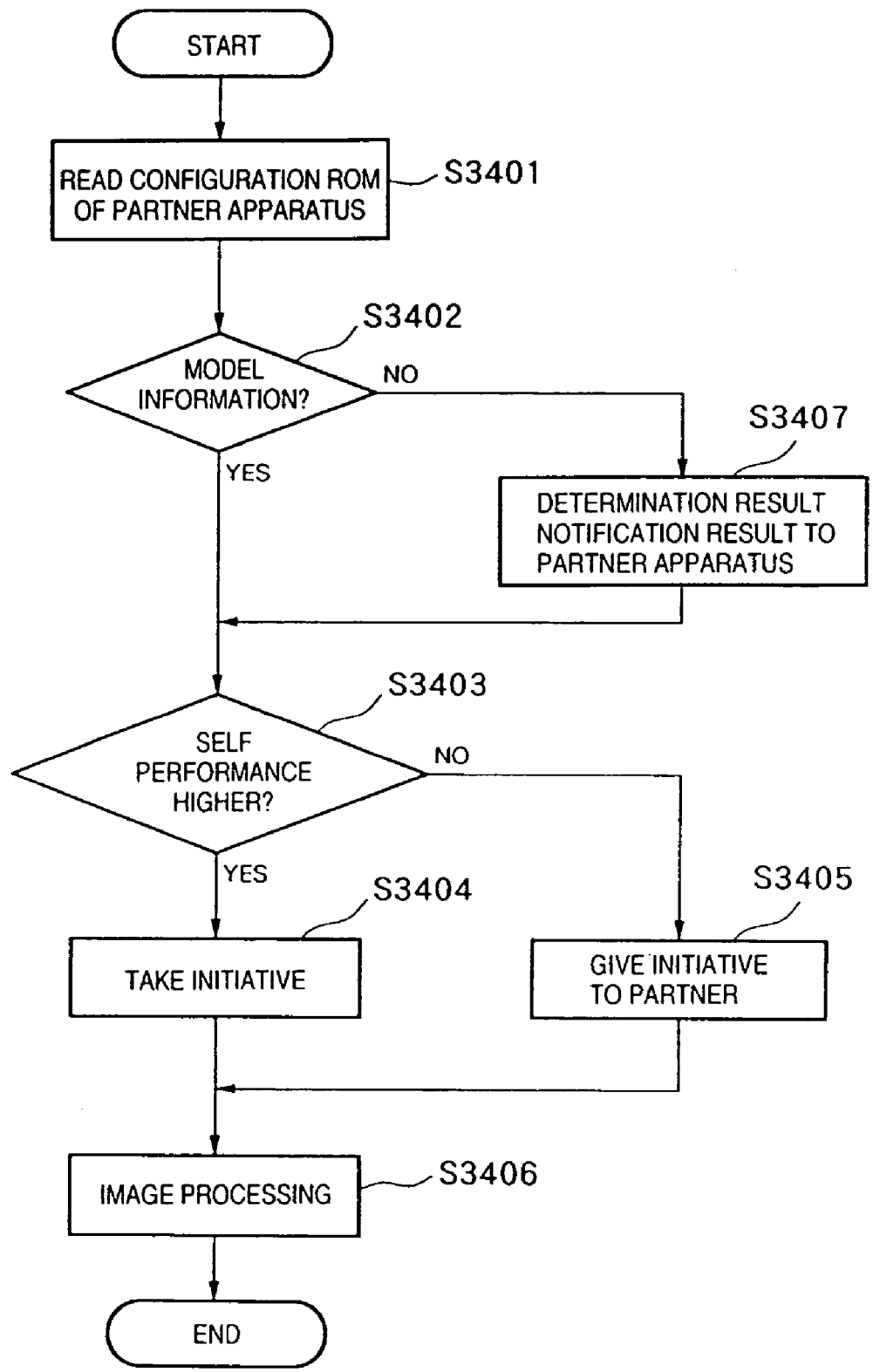
FIG. 32 is a flowchart showing control apparatus determination processing for distribution of image processing in the third embodiment.

The outline of the determination method will be explained. Assume that each of the digital camera 1 and printer 2 has information about the model of connectable partner apparatus, and the partner model information contains in advance rank information representing whether the performance of the partner apparatus is higher or lower than the performance of the self apparatus. If the performance of the self apparatus is higher based on this rank information, the self apparatus controls distribution of image processing. If the performance of the self apparatus is lower, the partner apparatus controls distribution of image processing. FIG. 32 is a flowchart showing control apparatus determination processing for distribution of image processing. Processing shown in the flowchart is executed by both the digital camera 1 and printer 2.

In step S3401, an apparatus reads the contents of a configuration ROM in a partner apparatus in connection. In step S3402, the apparatus checks whether rank information is added to the connectable model information of the configuration ROM. If YES in step S3402, the process proceeds to step S3403, and the apparatus checks whether the performance of the partner apparatus is higher than that of the self apparatus by referring to the rank information of the self apparatus.

If YES in step S3403, the process advances to step S3404, and the self apparatus takes the initiative. If NO in step S3403, the process advances to step S3405, and the self apparatus enters a standby state while the partner apparatus takes the initiative. Accordingly, which of the apparatuses should control distribution of image processing is properly determined.

After the apparatus which takes the initiative of image processing distribution is determined, image processing described in the first and second embodiments is executed in step S3406.

If NO in step S3402, the process proceeds to step S3407, and the apparatus requests the partner apparatus to notify the apparatus of the determination result of an image processing distribution control apparatus on the partner apparatus side. This request is asynchronously transferred on the 1394 serial bus. After the apparatus receives the notification, the process proceeds to step S3403 to determine which of the apparatuses should control distribution of image processing.

If the configuration ROMs of both the apparatuses do not hold any model information or rank information, an apparatus which has first declared distribution control of image processing takes the initiative of the control.

As described above, according to the third embodiment, the image processing system which can transfer image data at high speed by directly connecting the digital camera and printer via the 1394 serial bus can properly determine which of the digital camera and printer performs control of optimally distributing necessary image processing between apparatuses. This can shorten the total time required for image printing processing in the system.

Fourth Embodiment

The fourth embodiment according to the present invention will be described.

An image processing system in the fourth embodiment has the same arrangement as that in the first embodiment, data is asynchronously transferred between a digital camera 1 and a printer 2, and a detailed description thereof will be omitted.

Generally in performing printing processing in a system constituted by connecting a personal computer (to be referred to as a PC hereinafter) to a printer, the PC must quickly complete printing processing to perform another operation. Considering an increase in the throughput of printing processing in this system, the data transfer time from the PC to the printer must be shortened. Further, the processing and operation speeds on the printer side and the capacity of the printer buffer must be increased.

In the system of the fourth embodiment constituted by connecting the digital camera and printer, the printing processing time on the printer side must be shortened to increase the total throughput.

Similar to the first embodiment, the fourth embodiment uses the 1394 serial bus to enable high-speed data transfer. To increase the throughput of the sequence of printing processing, sharing of image processing between the digital camera 1 and the printer 2 is important. In the fourth embodiment, therefore, decompression processing of compressed data is appropriately shared between the digital camera 1 and the printer 2. The fourth embodiment will be described based on the following assumptions, that data transfer via the 1394 serial bus is sufficiently fast, that the printing operation in the printer 2 is sufficiently fast, and that the printer 2 may wait for processing depending on the contents of image processing. The digital camera 1 holds image data compressed in the JPEG format.

The sequence of printing processing in the fourth embodiment will now be described in detail.

Figure 33A:
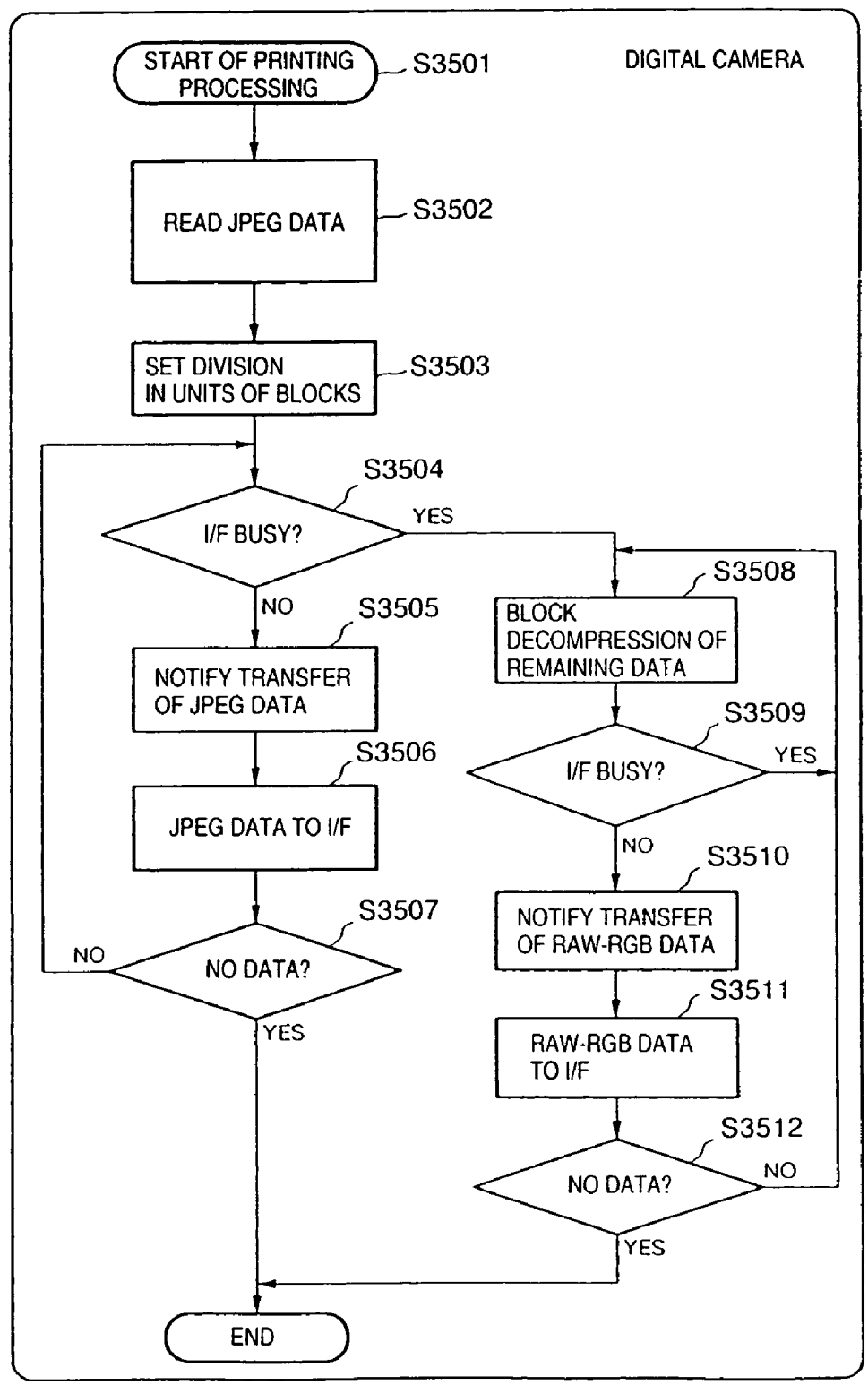
FIG. 33A is a flowchart showing printing processing in a digital camera in the fourth embodiment.
Figure 33B:
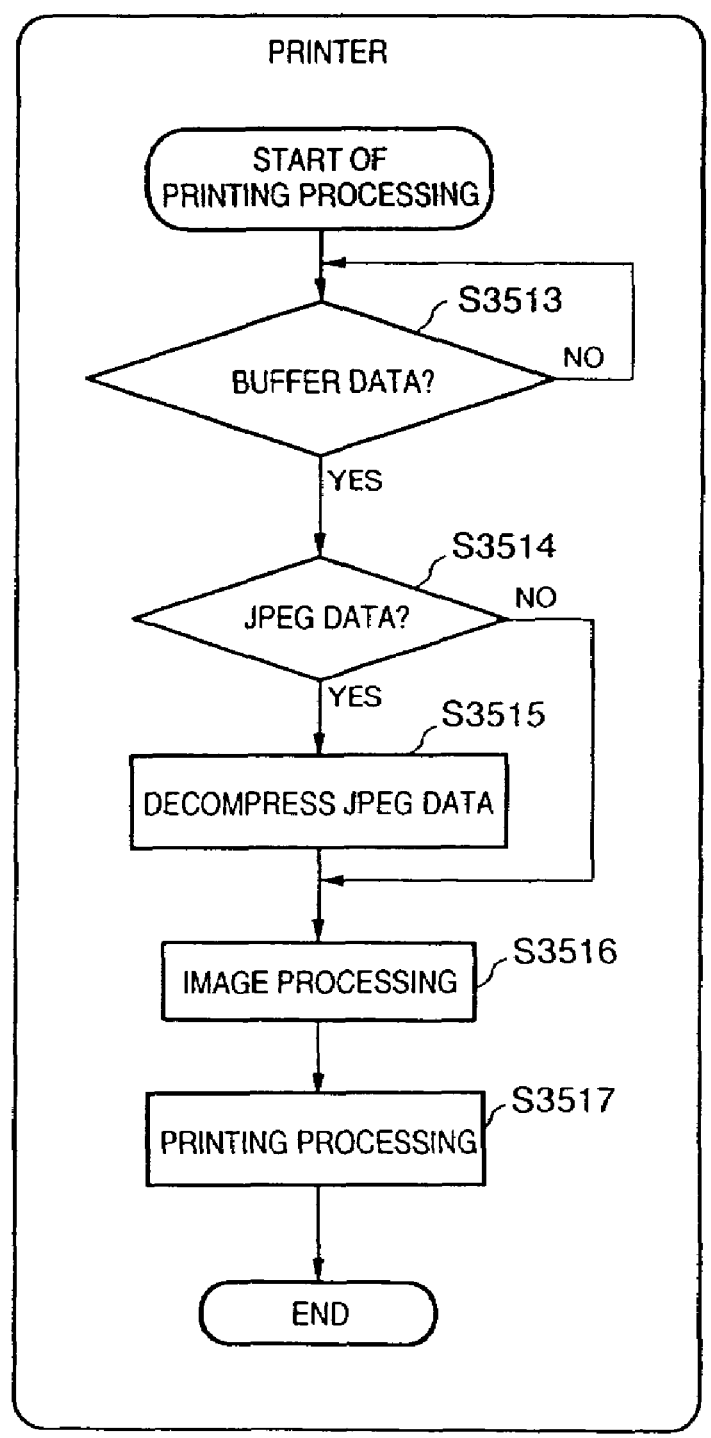
FIG. 33B is a flowchart showing printing processing in a printer in the fourth embodiment.

FIGS. 33A and 33B are flowcharts showing details of the sequence of printing processing in the fourth embodiment. FIG. 33A shows processing in the digital camera 1, and FIG. 33B shows processing in the printer 2.

Processing in the digital camera 1 shown in FIG. 33A will now be explained.

If printing processing starts in step S3501, the digital camera 1 reads out JPEG data to be printed from an image memory (not shown) in step S3502, and divides the JPEG data into predetermined blocks in step S3503. In step S3504, the digital camera 1 detects the state of an I/F 3. If the I/F 3 is in a ready state in which data transfer is possible, the process proceeds to step S3505; and if the I/F 3 is in a standby state (busy state) in which data transfer is impossible, to step S3508.

The ready/busy state of the I/F 3 is determined based on whether the print buffer of the printer 2 is empty. If the buffer of the printer 2 is full and has no free space, the I/F 3 is in the busy state. In general, the buffer of the printer 2 has a free space at the initial stage of printing processing, and the I/F 3 is in the ready state in which data transfer is possible. Thus, the process branches to step S3505 at the initial stage of printing.

The digital camera 1 notifies the printer 2 of transfer of the JPEG data in step S3505, and transfers the JPEG data to the printer 2 via the I/F 3 in units of blocks in step S3506. If the JPEG data still remains in step S3507, the process returns to step S3504 to repeat the processing. If NO in step S3507, the digital camera 1 ends processing for printing.

If the I/F 3 is in the busy state in step S3504, the digital camera 1 decompresses the remaining JPEG data in units of blocks in step S3508, and checks in step S3509 as to whether the I/F state has changed to the ready state. If the I/F 3 is still busy, the digital camera 1 repeats JPEG block decompression in step S3508. If the I/F state has changed to the ready state, the process advances to step S3510.

The digital camera 1 notifies the printer 2 in step S3510 of transfer of RAW-RGB data obtained by decompressing the JPEG data, and transfers the RAW-RGB data to the printer 2 via the I/F 3 in units of blocks (S3511). If JPEG data still remains in step S3512, the process returns to step S3508 to repeat processing. If NO in step S3512, processing ends.

Processing in the printer 2 shown in FIG. 33B will now be explained.

If a CPU 10 of the printer 2 receives the JPEG data transfer notification (step S3505) or RAW-RGB data transfer notification (step S3510) from the digital camera 1, the CPU 10 sets or resets the internal JPEG flag. The CPU 10 sets the JPEG flag if the transferred image data to be printed is JPEG data, or resets the JPEG flag if the image data is RAW-RGB data.

If the printer 2 starts printing processing, it checks in step S3513 as to whether image data to be printed that has been transferred via an I/F 4 is stored in the buffer area of a RAM 12. If NO in step S3513, the printer 2 waits for transfer of image data; and if YES, the process proceeds to step S3514.

If the JPEG flag is set in the printer 2 in step S3514, image data in the buffer is determined to be JPEG data, and the process shifts to step S3515 to decompress the JPEG data, and to step S3516.

If NO in step S3514, image data in the buffer is determined to be RAW-RGB data, and the process directly shifts to step S3516. The printer 2 performs predetermined image processing necessary for printing in step S3516, and then executes printing processing in step S3517 to complete the sequence of printing processing.

As described above, according to the fourth embodiment, the buffer state in the printer 2 is monitored via the I/F 3 during transfer of JPEG data by the digital camera 1. When the state changes to the busy state in which transfer is impossible, the remaining JPEG data is decompressed to transfer RAW-RGB data.

In other words, the digital camera 1 determines the switching timing of the transfer data format, and executes JPEG data decompression processing. This enables efficient printing processing in the system to increase the total throughput.

Fifth Embodiment

The fifth embodiment according to the present invention will be described.

An image processing system in the fifth embodiment has the same arrangement as that in the first embodiment, data is asynchronously transferred between a digital camera 1 and a printer 2, and a detailed description thereof will be omitted.

The fifth embodiment is also based on the assumption that data transfer via the 1394 serial bus is sufficiently fast, the printer 2 may wait for processing because printing operation in the printer 2 is sufficiently fast, and the digital camera 1 holds image data compressed in the JPEG format.

Also in the fifth embodiment, decompression processing of compressed data is shared between the digital camera 1 and the printer 2, but the sharing timing is determined by the printer 2.

The sequence of printing processing in the fifth embodiment will be described in detail.

Figure 34A:
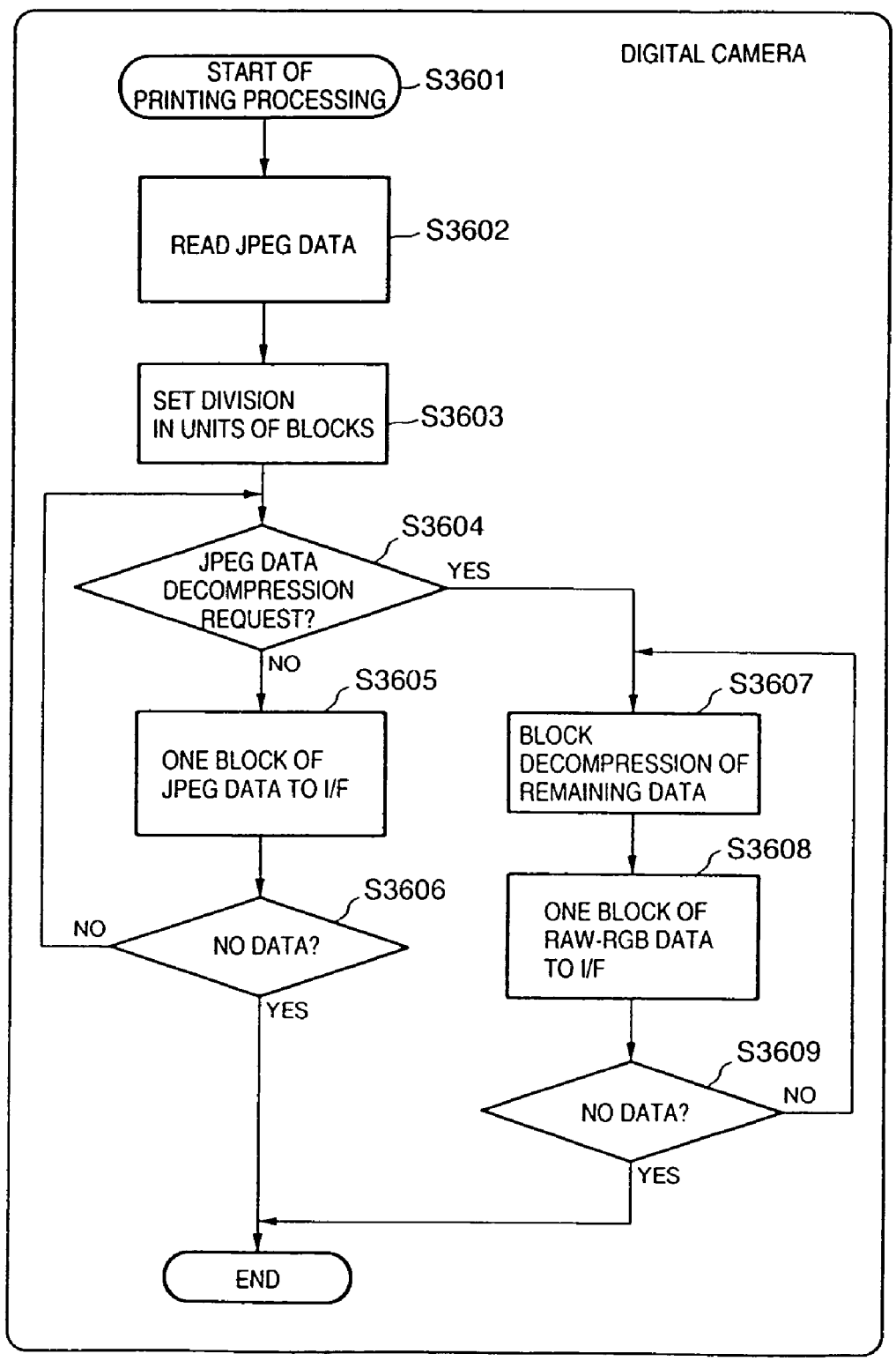
FIG. 34A is a flowchart showing printing processing in the digital camera in the fifth embodiment.
Figure 34B:
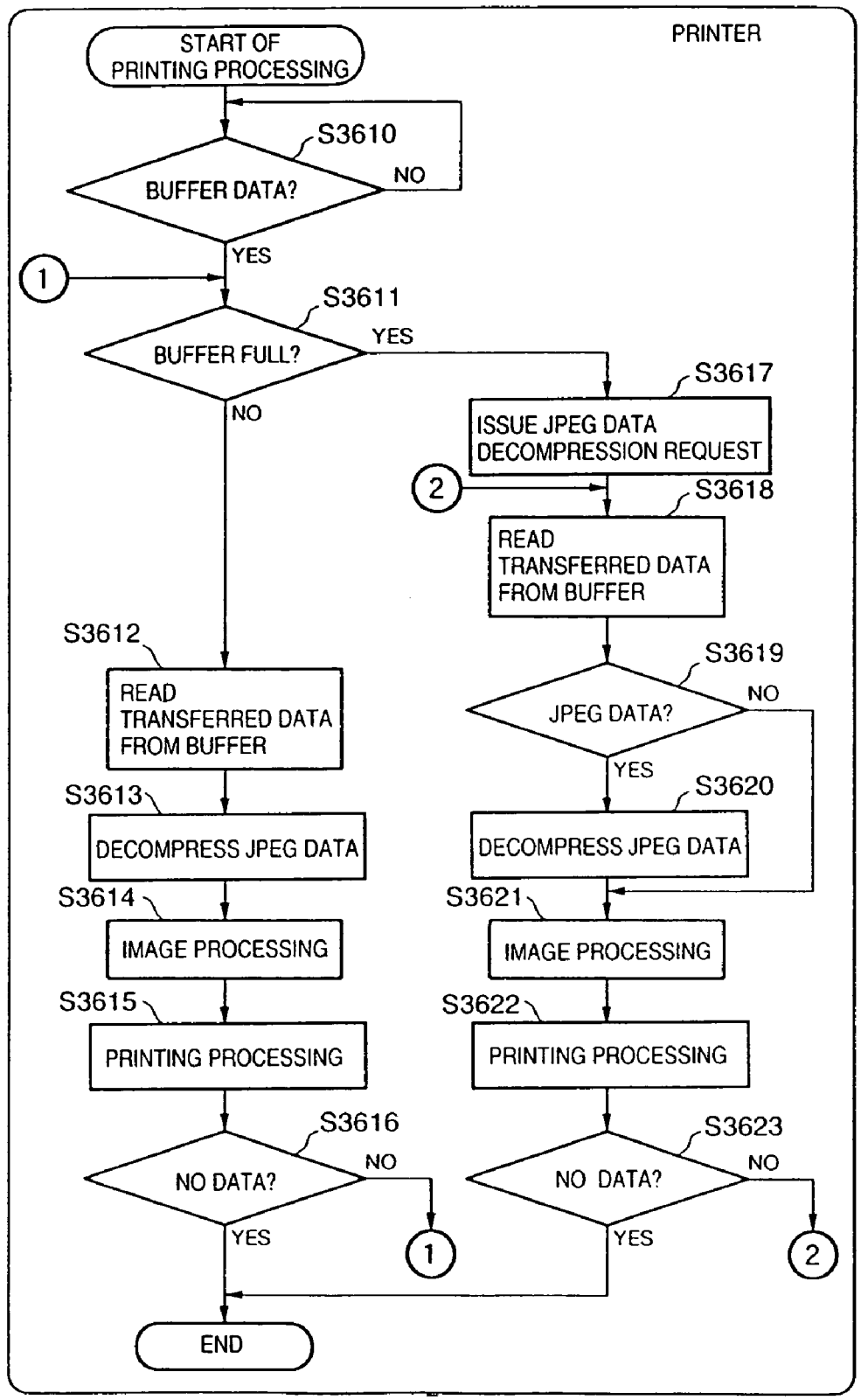
FIG. 34B is a flowchart showing printing processing in the printer in the fifth embodiment.

FIGS. 34A and 34B are flowcharts showing details of the sequence of printing processing in the fifth embodiment. FIG. 34A shows processing in the digital camera 1, and FIG. 34B shows processing in the printer 2.

Processing in the digital camera 1 shown in FIG. 34A will be explained.

If printing processing starts in step S3601, the digital camera 1 reads out JPEG data to be printed from an image memory (not shown) in step S3602, and divides the JPEG data into predetermined blocks in step S3603. In step S3604, the digital camera 1 checks a JPEG data decompression request from the printer 2. If YES in step S3604, the process advances to step S3607; and if NO, to step S3605. In the fifth embodiment, no decompression request is issued by the printer 2 at the initial stage of printing processing. Thus, the process advances to step S3605 at the initial stage. In step S3605, the digital camera 1 transfers JPEG data to the printer 2 via an I/F 3 in units of blocks. If the JPEG data still remains in step S3606, the process returns to step S3604 to repeat the processing. If NO in step S3606, the digital camera 1 ends processing for printing.

If NO in step S3604, the digital camera 1 decompresses the remaining JPEG data in units of blocks to generate RAW-RGB data in step S3607. In step S3608, the digital camera 1 transfers the RAW-RGB data to the printer 2 via the I/F 3 in units of blocks. If the JPEG data still remains in step S3609, the process returns to step S3607 to repeat processing. If NO in step S3609, processing ends.

Processing in the printer 2 shown in FIG. 34B will be explained.

If the printer 2 starts printing processing, it checks in step S3610 as to whether image data to be printed that has been transferred via an I/F 4 is stored in the buffer area of a RAM 12. If NO in step S3610, the printer 2 waits for transfer of image data to the buffer; and if YES, the process proceeds to step S3611.

In step S3611, the printer 2 checks as to whether the buffer becomes full (buffer full state). If YES in step S3611, the process shifts to step S3617; or if NO, to S3612. In general, the buffer has a free space at the initial stage of printing processing, so that the process proceeds to step S3612. The printer 2 reads out in step S3612 JPEG data transferred from the digital camera 1, and decompresses the data in step S3613. The printer 2 performs predetermined image processing necessary for printing in step S3614, and then executes printing processing in step S3615. If the data still remains in step S3616, the process returns to step S3611; and if NO, printing processing ends.

If the buffer full state is detected in step S3611, the printer 2 issues a JPEG data decompression request to the digital camera 1 in step S3617.

In step S3618, the printer 2 reads out JPEG data transferred from the digital camera 1 from the buffer. If the JPEG data still remains in step S3619, the printer 2 decompresses it in step S3620. If NO in step S3619, the process proceeds to step S3621. The printer 2 performs predetermined image processing necessary for printing in step S3621, and then executes printing processing in step S3622. If the data still remains in step S3623, the process returns to step S3618; and if NO, printing processing ends.

As described above, according to the fifth embodiment, the printer 2 monitors its buffer state during transfer of JPEG data. When the buffer changes to the buffer full state, the printer 2 issues a JPEG data decompression request to the digital camera 1. In accordance with the decompression request, the digital camera 1 decompresses the remaining JPEG data to transfer RAW-RGB data.

That is, the printer 2 determines the switching timing of the transfer data format, and requests JPEG data decompression processing of the digital camera 1. This enables efficient printing processing in the system to increase the total throughput.

Sixth Embodiment

The sixth embodiment according to the present invention will now be described.

An image processing system in the sixth embodiment has the same arrangement as that in the first embodiment, data is asynchronously transferred between a digital camera 1 and a printer 2, and detailed description thereof will be omitted.

The sixth embodiment is also based on the assumption that data transfer via the 1394 serial bus is sufficiently fast, that the printer 2 may wait for processing because printing operation in the printer 2 is sufficiently fast, and the digital camera 1 holds image data compressed in the JPEG format.

Also in the sixth embodiment, decompression processing of compressed data is shared between the digital camera 1 and the printer 2, but the sharing timing is determined by the printer 2.

The sequence of printing processing in the sixth embodiment will be described in detail.

Figure 35A:
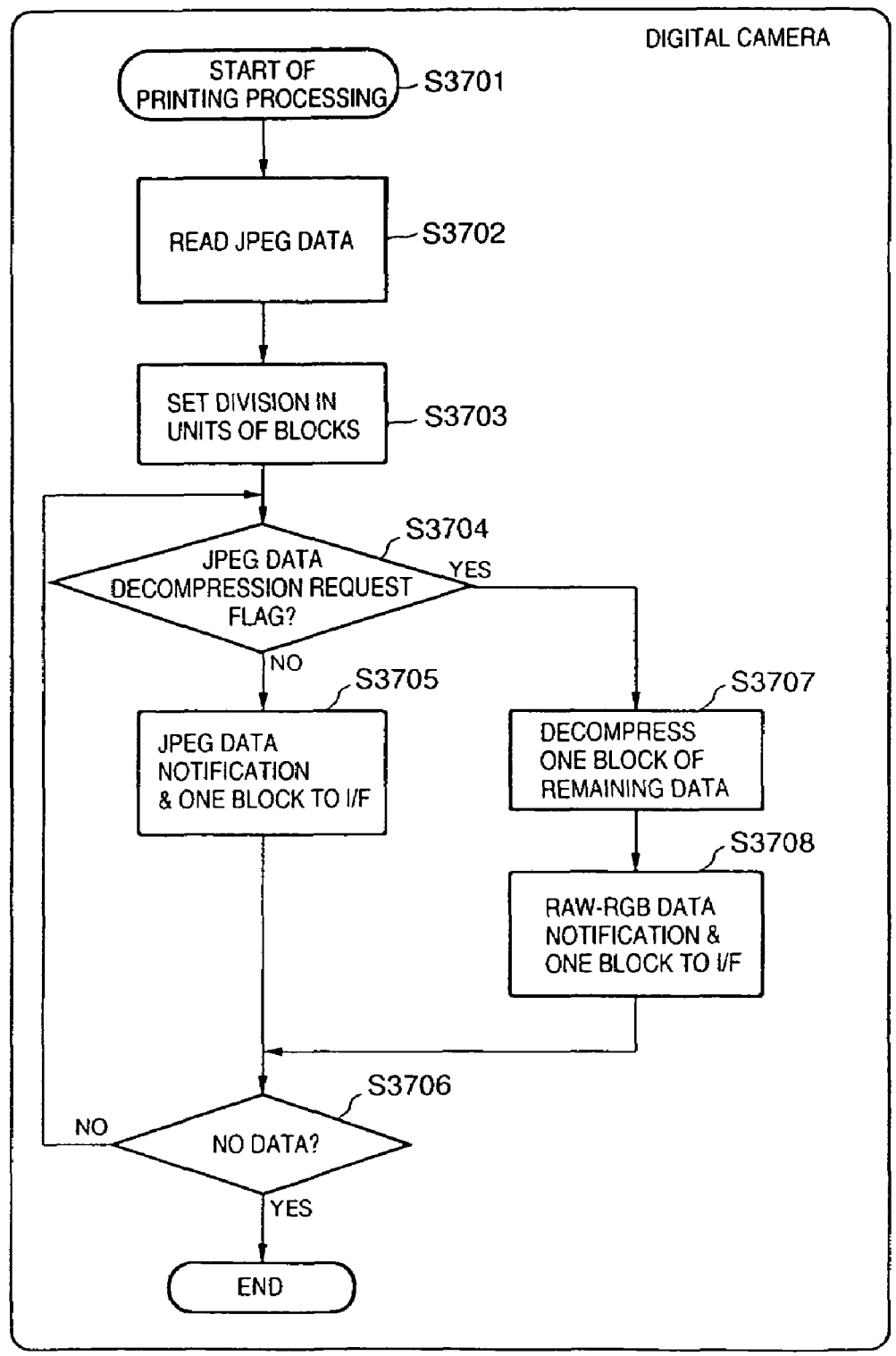
FIG. 35A is a flowchart showing printing processing in the digital camera in the sixth embodiment.
Figure 35B:
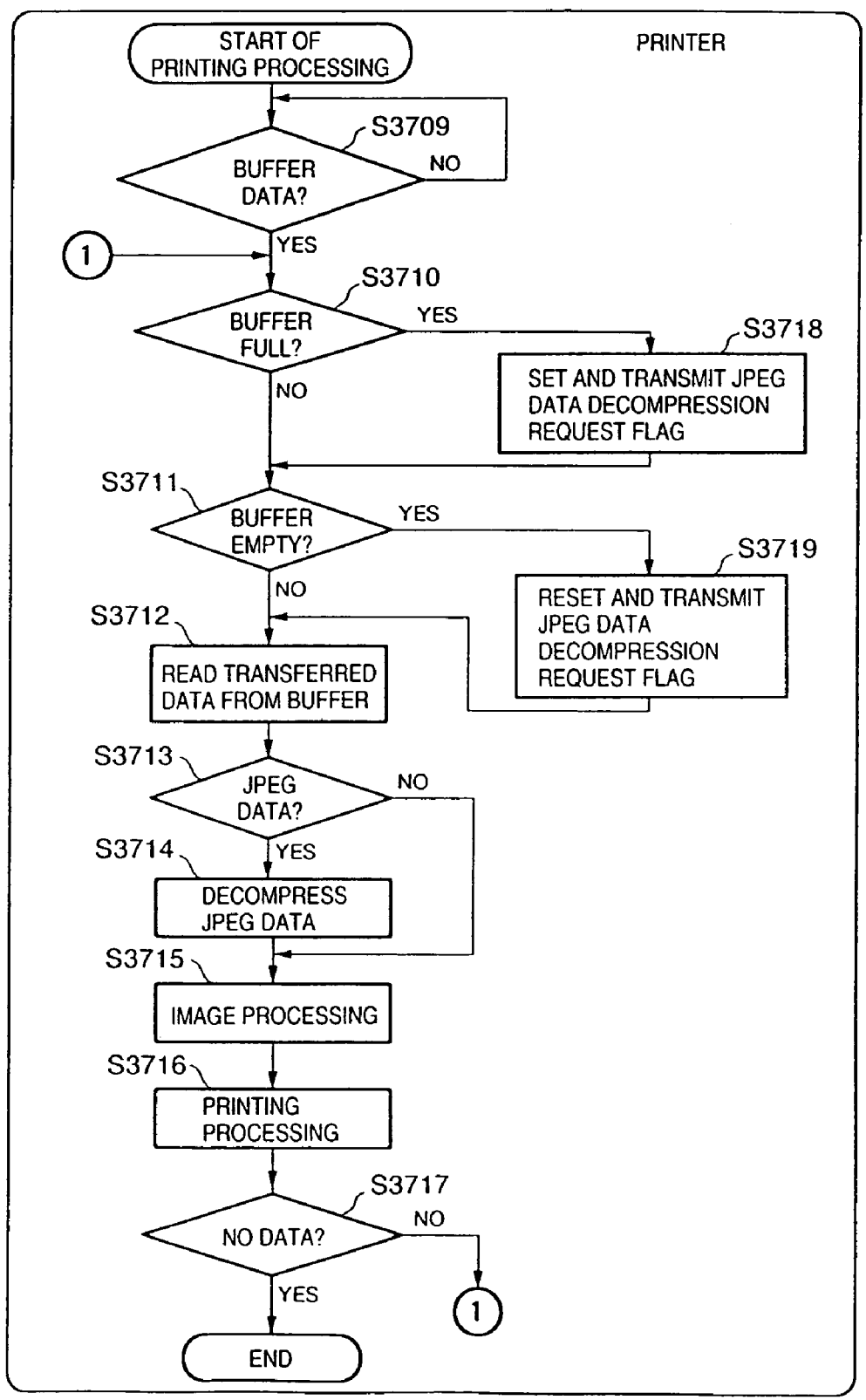
FIG. 35B is a flowchart showing printing processing in the printer in the sixth embodiment.

FIGS. 35A and 35B are flowcharts showing details of the sequence of printing processing in the sixth embodiment. FIG. 35A shows processing in the digital camera 1, and FIG. 35B shows processing in the printer 2.

Processing in the digital camera 1 shown in FIG. 35A will be explained.

If printing processing starts in step S3701, the digital camera 1 reads out JPEG data to be printed from an image memory (not shown) in step S3702, and divides the JPEG data into predetermined blocks in step S3703. In step S3704, the digital camera 1 checks whether it has received a decompression request flag representing a JPEG data decompression request issued by the printer 2. If YES in step S3704, the process advances to step S3707; and if NO, to step S3705. In the sixth embodiment, no decompression request is issued by the printer 2 at the initial stage of printing processing. Thus, the process advances to step S3705 at the initial stage. In step S3705, the digital camera 1 notifies the printer 2 of transfer of JPEG data, and transfers one block of JPEG data to the printer 2 via an I/F 3. If the JPEG data still remains in step S3706, the process returns to step S3704 to repeat the processing. If NO in step S3706, the digital camera 1 ends processing for printing.

If NO in step S3704, the digital camera 1 decompresses one block of the remaining JPEG data to generate RAW-RGB data in step S3707. In step S3708, the digital camera 1 notifies the printer 2 of transfer of the RAW-RGB data obtained by decompressing JPEG data, and transfers one block of the RAW-RGB data to the printer 2 via the I/F 3. Then, the process proceeds to step S3706.

Processing in the printer 2 shown in FIG. 35B will be explained. If the printer 2 starts printing processing, it checks in step S3709 whether image data to be printed that has been transferred via an I/F 4 is stored in the buffer area of a RAM 12. If NO in step S3709, the printer 2 waits for transfer of image data to the buffer; and if YES, the process proceeds to step S3710.

In step S3710, the printer 2 checks whether the buffer becomes full (buffer full state). If YES in step S3710, the process shifts to step S3718. The printer 2 sets the JPEG data decompression request flag, and transmits it to the digital camera 1. After that, the process proceeds to step S3711. In general, the buffer has a free space at the initial stage of printing processing, so that the process proceeds to step S3711. In step S3711, the printer 2 checks whether the buffer has a free space (buffer empty state). If NO in step S3711, the process advances to step S3712; and if YES, to S3719. The printer 2 resets the JPEG data decompression request, and transmits it to the digital camera 1. Thereafter, the process proceeds to step S3712.

The printer 2 reads out in step S3712 JPEG data transferred from the digital camera 1. If the JPEG data sill remains in step S3713, the printer 2 decompresses it in step S3714. If NO in step S3713, the process advances to step S3715. The printer 2 performs predetermined image processing necessary for printing in step S3715, and then executes printing processing in step S3716. If the data still remains in step S3717, the process returns to step S3710; and if NO, printing processing ends.

As described above, according to the sixth embodiment, the printer 2 monitors its buffer state (full/empty) during transfer of JPEG data, and transmits the flag representing the buffer state to the digital camera 1 every time the buffer state changes. The digital camera 1 monitors buffer information of the printer 2 in accordance with the flag, and determines in units of blocks whether to decompress the remaining JPEG data.

That is, the digital camera 1 performs JPEG data decompression processing based on the buffer state notified from the printer 2. This enables efficient printing processing in the system to increase the total throughput.

Seventh Embodiment

The seventh embodiment according to the present invention will be described.

An image processing system in the seventh embodiment has the same arrangement as that in the first embodiment, data is asynchronously transferred between a digital camera 1 and a printer 2, and a detailed description thereof will be omitted.

The seventh embodiment is based on the assumptions that the data transfer speed via the 1394 serial bus is insufficient, that the printer 2 may wait for processing because printing operation in the printer 2 is sufficiently fast, and that the digital camera 1 holds image data compressed in the JPEG format.

In the fourth to sixth embodiments, JPEG data held by the digital camera 1 is transferred to the printer 2 after the JPEG data is decompressed by the digital camera if necessary. In this case, the first transferred data is JPEG data.

In general, the digital camera 1 can display data before sensed JPEG data which is compressed and held is printed. In this case, the JPEG is temporarily decompressed in display processing. Therefore, when data is printed after display processing, image data decompressed in display processing may be directly transferred to the printer 2.

If, however, the data transfer speed is not sufficiently high, like the seventh embodiment, the transfer time is prolonged with an increase in data amount to be transferred. As a result, the total throughput may decrease.

To prevent this, even if the digital camera 1 holds data which has already been decompressed, the seventh embodiment transfers the original JPEG data to the printer 2 in printing processing.

After this processing, i.e., after JPEG data is first transferred, decompression processing sharing control described in the fourth to sixth embodiments can be executed. However, if the data transfer speed is low, decompression processing is desirably performed by only the printer 2 in order to increase the total processing speed.

As described above, according to the seventh embodiment, the first data transfer in printing processing is limited to JPEG data, which can shorten the transfer time and allows the printer 2 to start printing operation at a higher timing. Accordingly, the total throughput of the system can increase.

Eighth Embodiment

The eighth embodiment according to the present invention will now be described.

An image processing system in the eighth embodiment has the same arrangement as that in the first embodiment, data is asynchronously transferred between a digital camera 1 and a printer 2, and detailed description thereof will be omitted.

The eighth embodiment is based on the assumptions that the printer 2 may wait for processing because printing operation in the printer 2 is sufficiently fast, and that the digital camera 1 holds image data compressed in the JPEG format.

In the eighth embodiment, when the first image data to be printed is compressed, a determination is made by a CPUS of he digital camera 1 as to which of plural apparatuses can most efficiently decompress the data, as follows.

If the data transfer speed is sufficiently high, i.e., equal to or higher than a predetermined value, the data transfer time can be shortened. From this, the CPU 5 determines that the digital camera 1 can more efficiently perform JPEG data decompression processing.

If the data transfer speed is lower than the predetermined value, the CPU 5 compares the performance of the digital camera 1 with that of the printer 2, and determines that an apparatus exhibiting higher performance executes decompression processing. As this performance comparison method, the CPU 5 can grasp the performance of the printer 2 by reading the contents of a configuration ROM in the printer 2 in connecting the digital camera 1 to the printer 2, and referring to model information described in the configuration ROM. If the configuration ROM of the printer 2 does not contain any model information, the printer 2 can read the configuration ROM of the digital camera 1 to determine the performance of the digital camera 1 and that of the printer 2, and can notify the digital camera 1 of the determination result.

If the data transfer speed is very low, the CPU 5 determines that decompression processing is efficiently done by only the printer 2.

After an apparatus which decompresses the first JPEG data is determined in accordance with the data transfer speed, printing processing by sharing described in the fourth to sixth embodiments is executed.

As described above, according to the eighth embodiment, which of the digital camera 1 and printer 2 can efficiently decompress the first JPEG data is appropriately determined to increase the throughput of printing processing.

In the above-described embodiments, the network is constructed using a serial interface defined by IEEE 1394. However, the present invention is not limited to this, and can also be applied to a network constructed using an arbitrary serial interface such as a universal serial bus (USB).

Other Embodiment

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium (or recording medium) storing software program codes for realizing the functions of the above-described embodiments to a system or apparatus, and causing the computer (or a CPU or MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the operating system (OS) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, the storage medium stores program codes corresponding to the flowcharts shown in FIGS. 29 to 35B.

As many apparently widely different embodiments of the present invention can be made without departing from the spirit and scope thereof, it is to be understood that the invention is not limited to the specific embodiments thereof except as defined in the appended claims.

What is claimed is:

1. An image input apparatus for connecting with a printing apparatus via a serial bus, wherein the printing apparatus receives image data from an apparatus to which the printing apparatus is connected, and is capable of converting JPEG coded image data into image data for printing as an image when the received image data is JPEG coded image data, the image input apparatus comprising:
    an input unit configured to input image data;
    an obtaining unit configured to obtain information for enabling data communication with the printing apparatus, in response to the power on of the printing apparatus or a connection between the image input apparatus and the printing apparatus, wherein the information includes an identification of a type of the printing apparatus;
    a determination unit configured to determine whether or not the image input apparatus should convert the JPEG coded image data into image data for printing using the printing apparatus, based on the type of the printing apparatus identified in the information obtained by said obtaining unit;
    a conversion unit configured to convert the JPEG coded image data into the image data for printing when said determination means determines that the JPEG coded image data into the image data is to be converted for printing; and
    a communication unit configured to transmit the JPEG coded image data or the image data converted by said conversion unit, to the printing apparatus.

2. An apparatus according to claim 1, wherein said determination unit determines whether the image input apparatus should convert the JPEG image data into image data for printing, based on the type of the printing apparatus and a communication speed with the printing apparatus.

3. An apparatus according to claim 2, wherein said determination unit predicts that a time period for printing becomes shorter in either a case in which the image input apparatus converts the JPEG coded image data or a case in which the printing apparatus converts the JPEG coded image data, and determines that the image input apparatus converts the JPEG coded image data, if the time period for printing is shorter in a case that the image input apparatus converts the JPEG coded image data.

4. An apparatus according to claim 2, wherein said determination unit calculates respective time periods for printing in a case in which the image input apparatus converts the JPEG coded image data and a case in which the printing apparatus converts the JPEG coded image data, and determines that the image input apparatus converts the JPEG coded image data, if the time period for printing is shorter in a case that the image input apparatus converts the JPEG coded image data.

5. An apparatus according to claim 4, wherein said determination unit calculates the time period based on a time period for converting the JPEG coded image data into image data for printing and a time period for transmitting the image data to the printing apparatus.

6. An apparatus according to claim 2, wherein said conversion unit performs a decompression process for decompressing the JPEG coded image data, a correction process for correcting image data decompressed in the decompression process, and a conversion process for converting image data corrected in the correction process into the image data for printing.

7. An apparatus according to claim 6, wherein said determination unit determines that said conversion unit executes any of the decompression process, the correction, process, and the conversion process, based on the type of the printing apparatus and the communication speed.

8. An apparatus according to claim 7, wherein said determination unit calculates respective time periods for performing the decompression process, the correction process, and the conversion process, of the image input apparatus and the printing apparatus, and determines whether the conversion unit should execute any of the decompression process, the correction process, and the conversion process, based on calculated respective time periods.

9. A control method of an image input apparatus for connecting with a printing apparatus via a serial bus, wherein the printing apparatus receives image data from an apparatus to which the printing apparatus is connected, and is capable of converting JPEG coded image data into image data for printing as an image when the received image data is JPEG coded image data, the method comprising:
    an input step of inputting image data;
    an obtaining step of obtaining information for enabling data communication with the printing apparatus, in response to the power on of the printing apparatus or a connection between the image input apparatus and the printing apparatus, wherein the information includes an identification of a type of the printing apparatus;
    a determination step of determining whether or not the image input apparatus converts should convert the JPEG coded image data into image data for printing using the printing apparatus, based on the type of the printing apparatus identified in the information obtained in said obtaining step;
    a conversion step of converting the JPEG coded image data into the image data for printing when it is determined in said determination step that the JPEG coded image data is to be converted into the image data for printing; and
    a communication step of transmitting the JPEG coded image data or the image data converted in said conversion step, to the printing apparatus.

* * * * *

UNITED STATES PATENT AND TRADEMARK OFFICE
CERTIFICATE OF CORRECTION

| | | |
|---|---|---|
| PATENT NO. | : 7,397,574 B1 | |
| APPLICATION NO. | : 09/650999 | |
| DATED | : July 8, 2008 | |
| INVENTOR(S) | : Jun Oida | |

It is certified that error appears in the above-identified patent and that said Letters Patent is hereby corrected as shown below:

SHEET 12:

Figure 12, "STOROBE" should read --STROBE--.

SHEET 24:

Figure 26, "chanel" should read --channel--.

COLUMN 4:

Line 59, "device C and H" should read --devices C and H--.

COLUMN 5:

Line 49, "constructs" should read --construct--; and
    Line 65, "address" should read --addresses--.

COLUMN 7:

Line 9, "mity" should read --mality--;
    Line 36, "ID's" should read --IDs--; and
    Line 58, "reset, however," should read --reset; however,--.

COLUMN 8:

Line 37, "notifies" should be deleted;
    Line 39, "failed." should read --filed.--; and
    Line 61, "failed." should read --filed.--.

UNITED STATES PATENT AND TRADEMARK OFFICE
CERTIFICATE OF CORRECTION

PATENT NO. : 7,397,574 B1
APPLICATION NO. : 09/650999
DATED : July 8, 2008
INVENTOR(S) : Jun Oida It is certified that error appears in the above-identified patent and that said Letters Patent is hereby corrected as shown below:

COLUMN 9:

Line 16, "(a roots" should read --(a root)--;
    Line 34, "leave node" should read --leaf node--;
    Line 35, "leave node" should read --leaf node--; and
    Line 62, "is not" should read --does not--.

COLUMN 10:

Line 23, ""OxFFFFF0000000." should read --OxFFFFF0000000,--; and
    Line 62, "the link layer 812," (second occurrence) should be deleted.

COLUMN 12:

Line 28, "in step S401," should read --In step S401,--; and
    Line 47, "requested" should read --requesting--.

COLUMN 13:

Line 66, "network," should read --network;--.

COLUMN 17:

Line 18, "routes B" should read --Routes B--.

COLUMN 18:

Line 10, "addition. route" should read --addition. Route--.

COLUMN 26:

Line 42, "explained. If the" should read --explained. ¶ If the--.

UNITED STATES PATENT AND TRADEMARK OFFICE
CERTIFICATE OF CORRECTION

| | |
|---|---|
| PATENT NO. | : 7,397,574 B1 |
| APPLICATION NO. | : 09/650999 |
| DATED | : July 8, 2008 |
| INVENTOR(S) | : Jun Oida |

It is certified that error appears in the above-identified patent and that said Letters Patent is hereby corrected as shown below:

<u>COLUMN 28</u>:

Line 9, "he digital" should read --the digital--.

<u>COLUMN 30</u>:

Line 24, "correction," should read --correction--.

Signed and Sealed this

Thirteenth Day of January, 2009

JON W. DUDAS
*Director of the United States Patent and Trademark Office*